US012691809B2

(12) United States Patent
Helmens et al.

(10) Patent No.: US 12,691,809 B2
(45) Date of Patent: Jul. 28, 2026

(54) TRAILER SYSTEM, METHOD FOR TRANSPORTING AN OBJECT BY A TRAILER SYSTEM AND TRAILER JACK SYSTEM

(71) Applicant: MAMMOET HOLDING B.V., Utrecht (NL)

(72) Inventors: Wessel Helmens, Stolwijk (NL); Matthijs Gerard Eikelenboom, Kesteren (NL); Ronald Adrianus Cornelis Hoefmans, Molenschot (NL)

(73) Assignee: MAMMOET HOLDING B.V., Utrecht (NL)

( * ) Notice: Subject to any disclaimer, the term of this patent is extended or adjusted under 35 U.S.C. 154(b) by 477 days.

(21) Appl. No.: 18/008,561

(22) PCT Filed: Jun. 29, 2021

(86) PCT No.: PCT/EP2021/067849
§ 371 (c)(1),
(2) Date: Dec. 6, 2022

(87) PCT Pub. No.: WO2022/002936
PCT Pub. Date: Jan. 6, 2022

(65) Prior Publication Data
US 2023/0339384 A1     Oct. 26, 2023

(30) Foreign Application Priority Data

Jun. 29, 2020    (NL) ...................................... 2025942

(51) Int. Cl.
B60P 3/40          (2006.01)
B60P 1/02          (2006.01)
(Continued)

(52) U.S. Cl.
CPC ................... B60P 3/40 (2013.01); B60P 1/02 (2013.01); B62D 59/04 (2013.01); B62D 63/025 (2013.01);
(Continued)

(58) Field of Classification Search
CPC . B60P 3/40; B60P 1/02; B62D 63/068; B62D 59/04; B62D 63/025; B66F 1/02; B66F 3/46; B66F 7/20; B66F 7/10
(Continued)

(56) References Cited

U.S. PATENT DOCUMENTS 9,834,124 B2    12/2017  Pons et al.
2007/0272489 A1 * 11/2007  Putnam ................. B66F 7/0641
187/203
(Continued)

FOREIGN PATENT DOCUMENTS

DE        202014004907 U1 * 10/2015   ................ B60P 1/00
EP            2974905 A1 *  1/2016   ................ B60P 1/02
(Continued)

OTHER PUBLICATIONS

International Preliminary Report on Patentability in PCT Appl. PCT/EP2021/067849, mailed Oct. 19, 2022, 19-pgs.
(Continued)

*Primary Examiner* — Michael A Gump
(74) *Attorney, Agent, or Firm* — Cabello Hall & Zinda, PLLC

(57)          ABSTRACT

A trailer system includes a first trailer module, having a plurality of wheels, a loading bed, and a primary loading bed connector for connecting to a loading bed of a further trailer module to form a combined rigid loading bed. The primary loading bed connector is arranged below an upper surface of the loading bed of the first trailer module. A first jack system includes a first jack cradle, which has a jack holder, and a
(Continued)

jack accommodated in the jack holder. A primary cradle connector is connected to the primary loading bed connector of the first trailer module and therewith connects the first jack cradle to the first trailer module. The jack holder extends at least partly below the upper surface of the loading bed of the of the first trailer module.

11 Claims, 8 Drawing Sheets

(51) Int. Cl.
| | |
|---|---|
| *B62D 59/04* | (2006.01) |
| *B62D 63/02* | (2006.01) |
| *B62D 63/06* | (2006.01) |
| *B66F 1/02* | (2006.01) |
| *B66F 7/20* | (2006.01) |

(52) U.S. Cl.
CPC .............. *B62D 63/068* (2013.01); *B66F 1/02* (2013.01); *B66F 7/20* (2013.01)

(58) Field of Classification Search
USPC ................................................... 254/14, 418
See application file for complete search history.

(56) References Cited

U.S. PATENT DOCUMENTS

| | | | | | |
|---|---|---|---|---|---|
| 2014/0346421 | A1* | 11/2014 | Wensel | ................. | E04G 23/065 |
| | | | | | 254/133 R |
| 2016/0257361 | A1 | 9/2016 | Habernegg | | |
| 2018/0339736 | A1* | 11/2018 | Lutz | .......................... | B60P 3/40 |
| 2022/0185640 | A1* | 6/2022 | Schiphorst | .............. | B66F 1/025 |

FOREIGN PATENT DOCUMENTS

| | | | |
|---|---|---|---|
| JP | H11115620 | A | 4/1999 |
| NL | 1042448 | B1 | 1/2019 |
| NL | 2019773 | B1 * | 4/2019 |

OTHER PUBLICATIONS

Search Report and Written Opinion in Appl. NL 2025942, dated May 18, 2021, 17-pgs.
Written Opinion in PCT Appl. PCT/EP2021/067849, mailed Jun. 1, 2022, 6-pgs.

Evidence A1, Ullrich & Naumann, "Feature Analysis: EP 4171996," dated May 9, 2025, 12-pgs.
Evidence A2, Wikipedia, "Jack (device)," downloaded from en.wikipedia.org, dated Mar. 8, 2025.
Evidence D6-A1, Scheuerle Vehicle Factory GmbH, "Invoice: DIN A4 Brochures," dated Nov. 24, 2010, 1-pg.
Evidence D6-A2, Scheuerle, "SPMT—Self-Propelled Modular Transporters," Product Brochure, undated, 8-pgs.
Evidence D6-A3, Scheuerle, webpage for download of Scheuerle Brochures, www.scheuerle.com, dated Apr. 25, 2011, 1-pg.
Evidence D7, "Various prior solutions in the heavy transport and lifting sector," undated, 5-pgs.
Evidence D7, Scheuerle, "Our Budget Offer: Lifting Device for Scheuerle SPMT units," Letter from Head of Sales Administration, dated May 4, 2010, 13-pgs.
Evidence D7-A1, Scheuerle-Fahrzeugfabrik GMBH, "Hubtisch 400t NL," Schematic, dated Feb. 5, 2010, 1-pg.
Evidence D7-A2, Scheuerle Fahrzeugfabrik GmbH, "Hubtisch 2-file SPMT," Drawing Layout, dated Feb. 5, 2010, 1-pg.
Evidence D7-A3, Scheuerle Fahrzeugfabrik GmbH, "Hubtisch 4file SPMT," Drawing Layout, dated Feb. 5, 2010, 1-pg.
Evidence D7-A4, Saville, M., Email from Sales Assistant for Scheuerle, dated May 10, 2010, 1-pg.
Evidence D8, "Mammoet," Historie Jun. 29, 2017, [cited May 28, 2025] Available from: [https://web.archive.org/web/20170629142124/ http:// www.mammoetbenelux.n], copyright 2017, 5-pgs.
Evidence D8-A1, Scheuerle, "Spacer Mit Hubeinrichtung, 100 TO," Drawing Files, undated, 4-pgs.
Evidence D8-A2, Pictures, undated.
Evidence D8-A3, Scheuerle Fahrzeugfabrik GmbH, "Stand—Layout Bauma 2013," Drawing Layout, dated Nov. 29, 2012, 32-pgs.
Evidence D8-A4, Pictures, undated, 12-pgs.
Evidence D8-A5, Scheuerle, "Kamag," undated.
Evidence D8-A6, TII Group, "TII Group with Scheuerle, Nicolas and Kamag—positive review of bauma 2013," Prese Release dated May 2013, 15-pgs.
Evidence D9, Wikipedia, "Self-propelled modular transporter," downloaded from wikipedia.org, dated Oct. 26, 2019, 4-pgs.
Japanese Office Action in counterpart JP 2022-580962, mailed Jun. 24, 2025, 8-pgs.
Notice of Opposition in counterpart EP 21736323.3, dated Jun. 10, 2025, 83-pgs.
Evidence D6, "Scheuerle," SPMT—Self-Propelled Modular Transporters, undated, 8-pgs.

* cited by examiner

TRAILER SYSTEM, METHOD FOR TRANSPORTING AN OBJECT BY A TRAILER SYSTEM AND TRAILER JACK SYSTEM

FIELD OF THE DISCLOSURE

The invention pertains to a trailer system, a method for moving an object by a trailer system and a trailer jack system.

BACKGROUND

For transporting large and/or heavy objects, like pipe racks, bridge decks or buildings, it is known to use modular trailer systems, for example self-propelled modular trailer systems. Modular trailer systems may comprise multiple trailer modules. Each trailer module comprises a plurality of wheels, which in many cases can be individually controlled so that the trailer module can move over the surface in any desired direction, including sideways and around its own central axis. Each trailer module further comprises a load bed, for supporting an object to be moved. The object can be placed directly on the loading bed, and/or be supported by object supports which are in turn supported by the loading bed. The trailer modules can be connected to each other in longitudinal and/or transverse directions to obtain a combined loading bed, which is larger than the loading bed of an individual trailer module. The combined loading bed is rigid in order to maintain stability of the load. So, the loading beds of individual modules do for example not hinge relative to each other. This is also not necessary, because the wheels of the trailer modules often can be individually controlled and rotated individually about both a horizontal and a vertical axis. The trailer modules can also be used individually, when the size and weight of the object to be transported allows this.

In order to pick up an object to be transported, the loading bed of a trailer module or the combined loading bed of multiple mutually connected trailer modules is arranged below the object. The object may need to be lifted and put on temporary ground supports in order to allow this. The object is then lowered onto the loading bed or onto loading bed supports on the loading bed of the trailer module(s) in order to prepare the object for transport. The loading bed supports may be static or may be moveable, e.g. in the form of jacks. In some designs, the loading bed of a trailer module can be moved in vertical direction over a limited stroke, e.g. 600 mm. In that case, the loading bed can be moved upwards to a limited extent to lift the object away from the temporary ground supports, so the object can be fully supported on the loading bed of the trailer module or trailer modules and the temporary ground supports can be removed.

Often, this approach requires a lot of time, labor and materials, in particular support materials. The large amount of materials that are required means that more transport of goods to the site where the object is located is required, which increases the $CO_2$-footprint of the transport project. In addition, when loading bed supports need to be used, this increases the overall height of the trailer system, which results in that more free space is needed below the object in order to arrange the trailer module below it. Also it may affect the stability of the trailer system when to object has to be engaged at a significant height, because this results in a high center of gravity.

SUMMARY

It is the object of the invention to provide a trailer system which limits the need for high load bed supports onto the load bed of a trailer module.

The object of the invention is obtained by a trailer system, which comprises:
- a first trailer module, which first trailer module comprises:
  - a plurality of wheels,
  - a loading bed,
  - a primary loading bed connector for rigidly connecting the loading bed of the first trailer module to a loading bed of a further trailer module to form a combined rigid loading bed, which primary loading bed connector is arranged below an upper surface of the loading bed of the first trailer module,
- a first jack system comprising a first jack cradle, which first jack cradle comprises:
  - a jack holder, and a jack which is accommodated in the jack holder,
  - a primary cradle connector, which is connected to the primary loading bed connector of the first trailer module and therewith connects the first jack cradle to the first trailer module,
  - wherein the jack holder of the first jack cradle extends at least partly below the upper surface of the loading bed of the of the first trailer module.

The trailer system according to the invention comprises a first trailer module. The first trailer module is for example a trailer module of a self-propelled modular trailer system, or a trailer module which can be connected to a truck.

The first trailer module comprises a plurality of wheels. Optionally, at least some of the wheels- and optionally all of the wheels—are rotatable around a horizontal axis and also pivotable or rotatable around a vertical axis. Optionally the position of each wheel around its vertical axis of rotation can be controlled individually, so that the first trailer module is able to move over the surface in all directions onto which it is located. Optionally, the rotational speed of each wheel around its horizontal axis of rotation can be controlled individually. Optionally, the wheels are grouped in pairs, and the rotation around the horizontal axis and/or around the vertical axis is controlled per pair of wheels.

In a variant of the invention, the first trailer module comprises one or more groups of wheels which are provided with one or more tracks.

The first trailer module further comprises a loading bed. Objects to be transported are to be arranged on the loading bed, either directly or on loading bed supports which are arranged on the loading bed. The loading bed has an upper surface.

The first trailer module further comprises a primary loading bed connector for rigidly connecting the loading bed of the first trailer module to a loading bed of a further trailer module to form a combined rigid loading bed. The primary loading bed connector is arranged below an upper surface of the loading bed of the first trailer module.

The first trailer module does not have to be connected to a further trailer module in order to practice the current invention.

The trailer system according to the invention further comprises a first jack system. The first jack system comprises a first jack cradle.

The jack cradle comprises a jack holder and a jack. The jack is accommodated in the jack holder.

The jack cradle further comprises a primary cradle connector, which is connected to the primary loading bed connector of the first trailer module. Therewith the primary cradle connector connects the first jack cradle to the first trailer module. So, a connector that is provided on the first trailer module to in other uses of the first trailer module connect the first trailer module to a further trailer, is in accordance with the invention used to instead connect the first trailer module to the first jack cradle.

In accordance with the invention, the jack holder of the first jack cradle extends at least partly below the upper surface of the loading bed of the of the first trailer module. Optionally, the jack holder of the first jack cradle extends entirely below the upper surface of the loading bed of the of the first trailer module.

Optionally, the jack holder extends at least partly below the primary cradle connector.

Optionally, the jack holder extends fully below the primary cradle connector.

Optionally, the jack extends at least partly below the extends at least partly below the upper surface of the loading bed of the of the first trailer module and/or the primary cradle connector. Optionally, the jack extends fully below the extends at least partly below the upper surface of the loading bed of the of the first trailer module and/or the primary cradle connector.

Optionally, the jack of the jack system is or forms part of a jack as disclosed in NL 1042448.

Optionally, the loading bed of the first trailer module has a long side and a short side, and the first jack system is connected to the short side of the loading bed. Optionally, the first jack system does not extend beyond the width of the loading bed of the first trailer module to which it is connected, so the width of the first jack system extends entirely between a first longitudinal end and a second longitudinal end (which is opposite to the first longitudinal end) of the short side of the loading bed of the first trailer module. The first jack system may extend above and/or below the short side of the loading bed of the first trailer module. Optionally, the first jack cradle does not extend beyond the width of the loading bed of the trailer module to which it is connected. So, the width of the first jack cradle extends entirely between a first longitudinal end and a second longitudinal end (which is opposite to the first longitudinal end) of the short side of the loading bed of the first trailer module. The first jack cradle may extend above and/or below the short side of the loading bed of the first trailer module.

The trailer system according to the invention allows transport of the object in a vertical direction (by the jacks) as well as in a horizontal direction (by the trailer module on its wheels) without having to switch from one support location on the object to another. This is for example advantageous by long and flexible objects, such as pipe racks. The number of locations at which they can be effectively supported is limited, so without the need to take over from one support location to another, all available support locations can be used.

In addition, the trailer system according to the invention is of a compact design. By integrating a jack system into the trailer system, the need to arrange separate jacks onto the loading bed disappears, which allows to reduce the height of the trailer system. The jack system is positioned at a lower level than the loading bed, so even if extends above the upper surface of the loading bed, it will do so to a lesser extent as when the jack system would be mounted onto the loading bed, as was done in the prior art. This compact arrangement eliminates the need for lifting the object to be transported to a high level and supporting the object at this high level before arranging the trailer module underneath the object.

In addition, arranging the jack in the cradle which extends underneath the loading bed of the trailer allows support the object at a level close to the loading bed during transport. This increases the stability of the object and the trailer system during transport of the object.

Transports of large and/or heavy objects need to be designed on a case by case basis. The structure of the object has to be taken into account: where is the center of gravity, how flexible or rigid the object is and which parts of the object can withstand which level of mechanical loads? Then, it can be decided how to put together the modules of the trailer system so the object can be transported in a safe way. The mechanical properties of the trailer system, e.g. the forces, moments and torques the loading bed of the trailer module can bear, and the pressure on the individual wheels play an important role in this. In case multiple trailer modules are connected to each other, the loading beds of these trailer modules have to act as a single combined rigid loading bed, so in particular the moments and torques have to be transferred from the loading bed of one trailer module to another. However, the mechanical loads that the primary loading bed connector is subjected to when it is used to connect one loading bed to the loading bed of a further trailer module are entirely different from the mechanical loads that the primary loading bed connector is subjected to when it supports a jack system. The jack system may introduce significant vertical forces and resulting bending moments at the edge of the loading bed, while these forces and bending moments are not or only to a far less significant extent present when the loading beds of two trailer modules are connected to each other. Therefore, it is rather surprising that the primary loading bed connector has shown to be suitable for supporting the jack system.

In addition, the trailer system according to the invention eliminates or at least reduces the need to apply load spreaders to support the trailer system. The load will usually be distributed sufficiently due to the presence of the plurality of wheels.

The trailer system according to the invention allows for example to pick up an object to be transported at one location, at a low position, transport it to a destination and lift the object upwards to a significant height, for example a height of at least 6 meters, while supporting the object at the same location of that object during the transport and the lifting, with a single trailer system and no or very limited additional local rigging.

In an embodiment of the trailer system according to the invention, the jack has an upper jack surface. The upper jack surface is the surface of the jack which engages the object to be jacked up or jacked down. This object to be jacked up or down can for example be the object to be transported, or a jack cassette of the jack system. The upper jack surface is retractable to a position below the level of the upper surface of the loading bed of the first trailer module or at the same level as the upper surface of the loading bed of the first trailer module.

This embodiment offers a very compact design. As the upper jack surface can be retracted to or even below the upper surface of the loading bed, the jack system does not add any height to the trailer system, allowing the trailer system to be arranged below objects which are positioned at a relatively low position, e.g. 1.5 meters above ground level.

Optionally, the jack of the jack system is or forms part of a jack as disclosed in NL 1042448.

Optionally, the jack system is adapted to move the object to be transported in vertical direction over a distance of at least 6 meters.

In an embodiment of the trailer system according to the invention, the jack system further comprises a jack cassette. Optionally, the jack system comprises a plurality of jack cassettes. The jack cassettes are used to lift (or lower) an object over a larger length than the length of the stroke of the jack. The jack is adapted to lift a first jack cassette over the length of its stroke, so the jack is moved to its extended position while it engages the first jack cassette. Then the first jack cassette is supported in this position, and the jack retracts to its retracted position. A second jack cassette is arranged on top of the jack surface, and the first jack cassette continues to be supported in the higher position. The jack then lifts the second jack cassette, and the first jack cassette moves upwards along with the second jack cassette. This process is then repeated until the first jack cassette reaches its required height. To lower the first jack cassette again, the steps are carried out in the reverse order.

In this embodiment, the jack has an upper jack surface which is moveable between a retracted position and an extended position The jack holder has an opening which allows to insert a jack cassette on the upper jack surface when the upper jack surface is in its retracted position. The opening is for example arranged in a side or in a bottom of the jack holder.

Optionally, the retracted position of the upper jack surface is located below the level of the upper surface of the loading bed of the first trailer module.

Optionally, the jack of the jack system is or forms part of a jack as disclosed in NL 1042448.

Optionally, the jack system is adapted to move the object to be transported in vertical direction over a distance of at least 6 meters.

In an embodiment of the trailer system according to the invention, the first trailer module further comprises a power unit (in the art also known as power pack) which is adapted to control the rotation of the wheels of the first trailer module. The power unit is arranged on the first trailer module on a side opposite to where the first jack cradle is connected to the first trailer module.

Optionally in this embodiment, the trailer module comprises a secondary loading bed connector for rigidly connecting the loading bed of the first trailer module to a loading bed of a second further trailer module to form a combined rigid loading bed. The secondary loading bed connector is arranged below an upper surface of the loading bed of the first trailer module. The secondary loading bed connector is arranged at an opposite side of the loading bed with respect to the primary loading bed connector. Optionally, the power unit is connected to the trailer module by the secondary loading bed connector.

Optionally, the power unit is configured to control the rotation of the wheels of the first trailer module. Optionally, the power unit is configured to control the rotation of the wheels of the first trailer module around a horizontal axis of rotation as well as around a vertical axis of rotation. Optionally, the power unit is configured to separately control the rotation of each of the plurality of wheels of the first trailer module separately. Optionally, the power unit is configured to separately control the rotation of each one of the plurality of wheels of the first trailer module around a horizontal axis of rotation and about a vertical axis of rotation.

Optionally, the power unit is configured to control the rotational speed of each wheel around its horizontal axis of rotation.

Optionally, a further trailer module is connected to the first trailer module, either directly or on the opposite side of the jack cradle with respect to the side on which the first trailer module is connected to the jack cradle. Optionally, the power unit is configured to control the rotation of the wheels of the first trailer module and of the further trailer module. Optionally, the power unit is configured to control the rotation of the wheels of the first trailer module and the further trailer module around a horizontal axis of rotation as well as around a vertical axis of rotation. Optionally, the power unit is configured to separately control the rotation of each of the plurality of wheels of the first trailer module and the further trailer module separately.

Optionally, the power unit is configured to separately control the rotation of each one of the plurality of wheels of the first trailer module and of the further trailer module around a horizontal axis of rotation and about a vertical axis of rotation. Optionally, the power unit is configured to control the rotational speed of each wheel around its horizontal axis of rotation.

Optionally, the power unit comprises a hydraulic system for controlling the rotation of at least one wheel, optionally for controlling the rotation of all wheels of a single trailer module, optionally for controlling the rotation of all wheels of all trailer modules in the trailer system.

Optionally, the power unit is configured to control the jack of the jack system.

In an embodiment, the trailer system according to the invention further comprises a second trailer module, which second trailer module comprises:

a plurality of wheels, a loading bed, a primary loading bed connector for rigidly connecting the loading bed of the second trailer module to a loading bed of a further trailer module to form a combined rigid loading bed, which primary loading bed connector is arranged below an upper surface of the loading bed of the second trailer module.

In this embodiment, the first jack cradle comprises a secondary cradle connector, which is connected to the primary loading bed connector of the second trailer module and therewith connects the first jack cradle to the second trailer module.

In this embodiment, the first jack cradle is arranged between the first trailer module and the second trailer module.

In this embodiment, a second trailer module is connected to the jack cradle of the jack system. So, the trailer system in this embodiment contains the following array: first trailer module-first jack system-second trailer module.

Optionally, a power unit as described above may be connected to the first trailer unit or to the second trailer unit.

Optionally, further trailer modules and/or further jack systems may be present in this embodiment of the trailer system.

Optionally, the loading bed of the first trailer module has a long side and a short side, and the first jack system is connected to the short side of the loading bed of the first trailer module, and also the loading bed of the second trailer module has a long side and a short side, and the first jack system is connected to the short side of the loading bed of the second trailer module as well. Optionally, the first jack system does not extend beyond the width of the loading bed of the first trailer module to which it is connected and also not beyond the width of the loading bed of the second trailer module to which it is connected. So the width of the first jack system extends entirely between a first longitudinal end and a second longitudinal end (which is opposite to the first longitudinal end) of the short side of the loading bed of the first trailer module and also between a first longitudinal end and a second longitudinal end (which is opposite to the first longitudinal end) of the short side of the loading bed of the second trailer module. The first jack system may extend above and/or below the short side of the loading bed of the first trailer module and/or the second trailer module.

Optionally, the first jack cradle does not extend beyond the width of the loading bed of the first trailer module and second trailer module to which it is connected. So, the width of the first jack cradle extends entirely between a first longitudinal end and a second longitudinal end (which is opposite to the first longitudinal end) of the short side of the loading bed of the first trailer module and between a first longitudinal end and a second longitudinal end (which is opposite to the first longitudinal end) of the short side of the loading bed of the second trailer module. The first jack cradle may extend above and/or below the short side of the loading bed of the first trailer module and/or the second trailer module.

In an embodiment, the trailer system according to the invention further comprises a third trailer module, which third trailer module comprises:
   a plurality of wheels,
   a loading bed,
   a primary loading bed connector for rigidly connecting the loading bed of the third trailer module to a loading bed of a further trailer module to form a combined rigid loading bed, which primary loading bed connector is arranged below an upper surface of the loading bed of the third trailer module.

In this embodiment, the trailer system further comprises a second jack system comprising a second jack cradle, which second jack cradle comprises:
   a jack holder, and a jack which is accommodated in the jack holder,
   a primary cradle connector, which is connected to the primary loading bed connector of the third trailer module and therewith connects the second jack cradle to the third trailer module.

In this embodiment, the jack holder of the second jack cradle extends at least partly below the upper surface of the loading bed of the of the third trailer module. Optionally, the jack holder of the second jack cradle extends fully below the upper surface of the loading bed of the of the third trailer module.

Optionally, the loading bed of the third trailer module has a long side and a short side, and the second jack system is connected to the short side of the loading bed of the third trailer module. Optionally, the second jack system does not extend beyond the width of the loading bed of the third trailer module to which it is connected, so the width of the second jack system extends entirely between a first longitudinal end and a second longitudinal end (which is opposite to the first longitudinal end) of the short side of the loading bed of the third trailer module. The second jack system may extend above and/or below the short side of the loading bed of the third trailer module. Optionally, the second jack cradle does not extend beyond the width of the loading bed of the third trailer module. So, the width of the second jack cradle extends entirely between a first longitudinal end and a second longitudinal end (which is opposite to the first longitudinal end) of the short side of the loading bed of the third trailer module. The second jack cradle may extend above and/or below the short side of the loading bed of the third trailer module.

In this embodiment, the trailer system further comprises a first connector beam which has a first end which is connected to the first jack cradle and a second end which is connected to the second jack cradle.

In this embodiment, two arrays are present, each containing a trailer module and a jack system attached thereto. The first array comprises the first trailer module and the first jack system. The second array comprises the third trailer module and the second jack system. The two arrays are connected to each other via the first connector beam, which extends between the jack cradle of the first array and the jack cradle of the second array. The first connector beam optionally is or comprises a solid beam, a hollow beam and/or a lattice beam.

The arrays optionally are arranged adjacent to each other.

The two arrays may be identical to each other or different from each other.

At least one of the two arrays optionally further includes a power unit as described above.

Optionally, further trailer modules and/or further jack systems are present in at least one of the arrays.

The invention further pertains to a trailer system which comprises:
   a first trailer module, which first trailer module comprises:
      a plurality of wheels,
      a loading bed,
      a primary loading bed connector for rigidly connecting the loading bed of the first trailer module to a loading bed of a further trailer module to form a combined rigid loading bed, which primary loading bed connector is arranged below an upper surface of the loading bed of the first trailer module,
      a secondary loading bed connector for rigidly connecting the loading bed of the first trailer module to a loading bed of a second further trailer module to form a combined rigid loading bed, which secondary loading bed connector is arranged below an upper surface of the loading bed of the first trailer module, which secondary loading bed connector is arranged at an opposite side of the loading bed with respect to the primary loading bed connector,
   a first jack system comprising a first jack cradle, which first jack cradle comprises:
      a jack holder, and a jack which is accommodated in the jack holder,
      a primary cradle connector, which is connected to the primary loading bed connector of the first trailer module and therewith connects the first jack cradle to the first trailer module,
      wherein the jack holder of the first jack system extends at least partly below the upper surface of the loading bed of the of the first trailer module,
   a second jack system comprising a second jack cradle, which second jack cradle comprises:
      a jack holder, and a jack which is accommodated in the jack holder,
      a primary cradle connector, which is connected to the secondary loading bed connector of the first trailer module and therewith connects the second jack cradle to the first trailer module,
      wherein the jack holder of the second jack cradle extends at least partly below the upper surface of the loading bed of the of the first trailer module,
   a second trailer module, which second trailer module comprises:
      a plurality of wheels,
      a loading bed, a primary loading bed connector for rigidly connecting the loading bed of the second trailer module to a loading bed of a further trailer module to form a combined rigid loading bed, which primary loading bed connector is arranged below an upper surface of the loading bed of the second trailer module, a secondary loading bed connector for rigidly connecting the loading bed of the second trailer module to a loading bed of a second further trailer module to form a combined rigid loading bed, which secondary loading bed connector is arranged below an upper surface of the loading bed of the second trailer module, which secondary loading bed connector is arranged at an opposite side of the loading bed with respect to the primary loading bed connector, a third jack system comprising a third jack cradle, which third jack cradle comprises:

a jack holder, and a jack which is accommodated in the jack holder, a primary cradle connector, which is connected to the primary loading bed connector of the second trailer module and therewith connects the third jack cradle to the second trailer module, wherein the jack holder of the third jack system extends at least partly below the upper surface of the loading bed of the of the second trailer module, a fourth jack system comprising a fourth jack cradle, which fourth jack cradle comprises:

a jack holder, and a jack which is accommodated in the jack holder, a primary cradle connector, which is connected to the secondary loading bed connector of the second trailer module and therewith connects the fourth jack cradle to the second trailer module, wherein the jack holder of the fourth jack cradle extends at least partly below the upper surface of the loading bed of the of the second trailer module, a first connector beam which has a first end which is connected to the first jack cradle and a second end which is connected to the third jack cradle, a second connector beam which has a first end which is connected to the second jack cradle and a second end which is connected to the fourth jack cradle.

In this version of the trailer system according to the invention, two arrays are present, each having the composition jack system-trailer module-jack system. The first array comprises the first jack system, the first trailer module and the second jack system. The second array comprises the third jack system, the second trailer module and the further jack system. The two arrays are connected to each other via the first connector beam and via a second connector beam. The first connector beam extends between the first jack cradle (which forms part of the first array) and the third jack cradle (which forms part of the second array). The second connector beam extends between the second jack cradle (which forms part of the first array) and the fourth jack cradle (which forms part of the second array). The first connector beam optionally is or comprises a solid beam, a hollow beam and/or a lattice beam. The second connector beam optionally is or comprises a solid beam, a hollow beam and/or a lattice beam The arrays optionally are arranged adjacent to each other.

The two arrays may be identical to each other or different from each other.

At least one of the two arrays optionally further includes a power unit as described above.

Optionally, further trailer modules and/or further jack systems are present in at least one of the arrays.

Optionally, the loading bed of the first trailer module has a long side and a first short side, and the first jack system is connected to the first short side of the loading bed of the first trailer module. Optionally, the first jack system does not extend beyond the width of the loading bed of the first trailer module, so the width of the first jack system extends entirely between a first longitudinal end and a second longitudinal end (which is opposite to the first longitudinal end) of the first short side of the loading bed of the first trailer module. The first jack system may extend above and/or below the first short side of the loading bed of the first trailer module. Optionally, the first jack cradle does not extend beyond the width of the loading bed of the first trailer module. So, the width of the first jack cradle extends entirely between a first longitudinal end and a second longitudinal end (which is opposite to the first longitudinal end) of the first short side of the loading bed of the first trailer module. The first jack cradle may extend above and/or below the first short side of the loading bed of the first trailer module.

Optionally, alternatively or in addition, the loading bed of the first trailer module has a second short side, and the second jack system is connected to the second short side of the loading bed of the first trailer module. Optionally, the second jack system does not extend beyond the width of the loading bed of the first trailer module, so the width of the second jack system extends entirely between a first longitudinal end and a second longitudinal end (which is opposite to the first longitudinal end) of the second short side of the loading bed of the first trailer module. The second jack system may extend above and/or below the second short side of the loading bed of the first trailer module. Optionally, the second jack cradle does not extend beyond the width of the loading bed of the first trailer module. So, the width of the second jack cradle extends entirely between a first longitudinal end and a second longitudinal end (which is opposite to the first longitudinal end) of the second short side of the loading bed of the first trailer module. The second jack cradle may extend above and/or below the second short side of the loading bed of the first trailer module.

Optionally, alternatively or in addition, the loading bed of the second trailer module has a long side and a first short side, and the third jack system is connected to the first short side of the loading bed of the second trailer module. Optionally, the third jack system does not extend beyond the width of the loading bed of the second trailer module, so the width of the third jack system extends entirely between a first longitudinal end and a second longitudinal end (which is opposite to the first longitudinal end) of the first short side of the loading bed of the second trailer module. The third jack system may extend above and/or below the first short side of the loading bed of the second trailer module. Optionally, the third jack cradle does not extend beyond the width of the loading bed of the second trailer module. So, the width of the third jack cradle extends entirely between a first longitudinal end and a second longitudinal end (which is opposite to the first longitudinal end) of the first short side of the loading bed of the second trailer module. The third jack cradle may extend above and/or below the first short side of the loading bed of the second trailer module.

Optionally, alternatively or in addition, the loading bed of the second trailer module has a second short side, and the fourth jack system is connected to the second short side of the loading bed of the second trailer module. Optionally, the fourth jack system does not extend beyond the width of the loading bed of the second trailer module, so the width of the fourth jack system extends entirely between a first longitudinal end and a second longitudinal end (which is opposite to the first longitudinal end) of the second short side of the loading bed of the second trailer module. The fourth jack system may extend above and/or below the second short side of the loading bed of the second trailer module. Optionally, the fourth jack cradle does not extend beyond the width of the loading bed of the second trailer module. So, the width of the fourth jack cradle extends entirely between a first longitudinal end and a second longitudinal end (which is opposite to the first longitudinal end) of the second short side of the loading bed of the second trailer module. The fourth jack cradle may extend above and/or below the second short side of the loading bed of the second trailer module.

The invention further pertains to a trailer system, which comprises:

a first trailer module, which first trailer module comprises:
  a plurality of wheels,
  a loading bed,
  a primary loading bed connector for rigidly connecting the loading bed of the first trailer module to a loading bed of a further trailer module to form a combined rigid loading bed, which primary loading bed connector is arranged below an upper surface of the loading bed of the first trailer module,
  a secondary loading bed connector for rigidly connecting the loading bed of the first trailer module to a loading bed of a second further trailer module to form a combined rigid loading bed, which secondary loading bed connector is arranged below an upper surface of the loading bed of the first trailer module, which secondary loading bed connector is arranged at an opposite side of the loading bed with respect to the primary loading bed connector,
a first jack system comprising a first jack cradle, which first jack cradle comprises:
  a jack holder, and a jack which is accommodated in the jack holder,
  a primary cradle connector, which is connected to the primary loading bed connector of the first trailer module and therewith connects the first jack cradle to the first trailer module,
  wherein the jack holder of the first jack cradle extends at least partly below the upper surface of the loading bed of the of the first trailer module,
a second trailer module, which second trailer module comprises:
  a plurality of wheels,
  a loading bed,
  a primary loading bed connector for rigidly connecting the loading bed of the second trailer module to a loading bed of a further trailer module to form a combined rigid loading bed, which primary loading bed connector is arranged below an upper surface of the loading bed of the second trailer module,
  a secondary loading bed connector for rigidly connecting the loading bed of the second trailer module to a loading bed of a second further trailer module to form a combined rigid loading bed, which secondary loading bed connector is arranged below an upper surface of the loading bed of the second trailer module, which secondary loading bed connector is arranged at an opposite side of the loading bed with respect to the primary loading bed connector, a second jack system comprising a second jack cradle, which second jack cradle comprises:
  a jack holder, and a jack which is accommodated in the jack holder,
  a primary cradle connector, which is connected to the primary loading bed connector of the second trailer module and therewith connects the second jack cradle to the second trailer module,
  wherein the jack holder of the second jack cradle extends at least partly below the upper surface of the loading bed of the of the second trailer module,
  wherein the secondary loading bed connector of the first trailer module is connected to the secondary loading bed connector of the second trailer module,
a third trailer module, which third trailer module comprises:
  a plurality of wheels,
  a loading bed,
  a primary loading bed connector for rigidly connecting the loading bed of the third trailer module to a loading bed of a further trailer module to form a combined rigid loading bed, which primary loading bed connector is arranged below an upper surface of the loading bed of the third trailer module,
  a secondary loading bed connector for rigidly connecting the loading bed of the third trailer module to a loading bed of a second further trailer module to form a combined rigid loading bed, which secondary loading bed connector is arranged below an upper surface of the loading bed of the third trailer module, which secondary loading bed connector is arranged at an opposite side of the loading bed with respect to the primary loading bed connector,
a third jack system comprising a third jack cradle, which third jack cradle comprises:
  a jack holder, and a jack which is accommodated in the jack holder,
  a primary cradle connector, which is connected to the primary loading bed connector of the third trailer module and therewith connects the third jack cradle to the third trailer module,
  wherein the jack holder of the third jack cradle extends at least partly below the upper surface of the loading bed of the of the third trailer module,
a fourth trailer module, which fourth trailer module comprises:
  a plurality of wheels,
  a loading bed,
  a primary loading bed connector for rigidly connecting the loading bed of the fourth trailer module to a loading bed of a further trailer module to form a combined rigid loading bed, which primary loading bed connector is arranged below an upper surface of the loading bed of the fourth trailer module,
  a secondary loading bed connector for rigidly connecting the loading bed of the fourth trailer module to a loading bed of a second further trailer module to form a combined rigid loading bed, which secondary loading bed connector is arranged below an upper surface of the loading bed of the fourth trailer module, which secondary loading bed connector is arranged at an opposite side of the loading bed with respect to the primary loading bed connector,
a fourth jack system comprising a fourth jack cradle, which fourth jack cradle comprises:
  a jack holder, and a jack which is accommodated in the jack holder, a primary cradle connector, which is connected to the secondary loading bed connector of the fourth trailer module and therewith connects the fourth jack cradle to the fourth trailer module, wherein the jack holder of the fourth jack cradle extends at least partly below the upper surface of the loading bed of the of the fourth trailer module, wherein the secondary loading bed connector of the third trailer module is connected to the secondary loading bed connector of the fourth trailer module, a first connector beam which has a first end which is connected to the first jack cradle and a second end which is connected to the third jack cradle, a second connector beam which has a first end which is connected to the second jack cradle and a second end which is connected to the fourth jack cradle.

In this version of the trailer system according to the invention, two arrays are present, each having the composition jack system-trailer module-trailer module-jack system. The first array comprises the first jack system, the first trailer module, the second trailer module and the second jack system. The second array comprises the third jack system, the third trailer module, the fourth trailer module and the further jack system. The two arrays are connected to each other via the first connector beam and via a second connector beam. The first connector beam extends between the first jack cradle (which forms part of the first array) and the third jack cradle (which forms part of the second array). The second connector beam extends between the second jack cradle (which forms part of the first array) and the fourth jack cradle (which forms part of the second array). The first connector beam optionally is or comprises a solid beam, a hollow beam and/or a lattice beam. The second connector beam optionally is or comprises a solid beam, a hollow beam and/or a lattice beam The arrays optionally are arranged adjacent to each other.

The two arrays may be identical to each other or different from each other.

At least one of the two arrays optionally further includes a power unit as described above.

Optionally, further trailer modules and/or further jack systems are present in at least one of the arrays.

Optionally, the loading bed of the first trailer module has a long side and a first short side, and the first jack system is connected to the first short side of the loading bed of the first trailer module. Optionally, the first jack system does not extend beyond the width of the loading bed of the first trailer module, so the width of the first jack system extends entirely between a first longitudinal end and a second longitudinal end (which is opposite to the first longitudinal end) of the first short side of the loading bed of the first trailer module. The first jack system may extend above and/or below the first short side of the loading bed of the first trailer module.

Optionally, the first jack cradle does not extend beyond the width of the loading bed of the first trailer module. So, the width of the first jack cradle extends entirely between a first longitudinal end and a second longitudinal end (which is opposite to the first longitudinal end) of the first short side of the loading bed of the first trailer module. The first jack cradle may extend above and/or below the first short side of the loading bed of the first trailer module.

Optionally, alternatively or in addition, the loading bed of the second trailer module has a long side and a first short side, and the second jack system is connected to the first short side of the loading bed of the second trailer module. Optionally, the second jack system does not extend beyond the width of the loading bed of the second trailer module, so the width of the second jack system extends entirely between a first longitudinal end and a second longitudinal end (which is opposite to the first longitudinal end) of the first short side of the loading bed of the second trailer module. The second jack system may extend above and/or below the first short side of the loading bed of the second trailer module. Optionally, the second jack cradle does not extend beyond the width of the loading bed of the second trailer module. So, the width of the second jack cradle extends entirely between a first longitudinal end and a second longitudinal end (which is opposite to the first longitudinal end) of the first short side of the loading bed of the second trailer module. The second jack cradle may extend above and/or below the first short side of the loading bed of the second trailer module.

Optionally, alternatively or in addition, the loading bed of the third trailer module has a long side and a first short side, and the third jack system is connected to the first short side of the loading bed of the third trailer module. Optionally, the third jack system does not extend beyond the width of the loading bed of the third trailer module, so the width of the third jack system extends entirely between a first longitudinal end and a second longitudinal end (which is opposite to the first longitudinal end) of the first short side of the loading bed of the third trailer module. The third jack system may extend above and/or below the first short side of the loading bed of the third trailer module. Optionally, the third jack cradle does not extend beyond the width of the loading bed of the third trailer module. So, the width of the third jack cradle extends entirely between a first longitudinal end and a second longitudinal end (which is opposite to the first longitudinal end) of the first short side of the loading bed of the third trailer module. The third jack cradle may extend above and/or below the first short side of the loading bed of the third trailer module.

Optionally, alternatively or in addition, the loading bed of the fourth trailer module has a long side and a first short side, and the fourth jack system is connected to the first short side of the loading bed of the fourth trailer module. Optionally, the fourth jack system does not extend beyond the width of the loading bed of the fourth trailer module, so the width of the fourth jack system extends entirely between a first longitudinal end and a second longitudinal end (which is opposite to the first longitudinal end) of the first short side of the loading bed of the fourth trailer module. The fourth jack system may extend above and/or below the first short side of the loading bed of the fourth trailer module. Optionally, the fourth jack cradle does not extend beyond the width of the loading bed of the fourth trailer module. So, the width of the fourth jack cradle extends entirely between a first longitudinal end and a second longitudinal end (which is opposite to the first longitudinal end) of the first short side of the loading bed of the fourth trailer module. The fourth jack cradle may extend above and/or below the first short side of the loading bed of the fourth trailer module.

The invention further pertains to a trailer system, which comprises:

a first trailer module, which first trailer module comprises:

a plurality of wheels, a loading bed, a primary connector which is arranged below an upper surface of the loading bed of the first trailer module, a first jack system comprising a first jack cradle, which first jack cradle comprises:

a jack holder, and a jack which is accommodated in the jack holder, a primary cradle connector, which is connected to the primary connector of the first trailer module and therewith connects the first jack cradle to the first trailer module, wherein the jack holder of the first jack cradle extends at least partly below the upper surface of the loading bed of the of the first trailer module.

In this variant of the invention, the first jack system is connected to the primary connector of the first trailer module, which can be any suitable connector that is provided on the first trailer module below the upper surface of the loading bed of the first trailer module.

This variant allows to provide combinations and arrays of trailer modules and jack systems in accordance with ones described above. This variant can also be used in the method according to the invention and the described embodiments thereof.

Optionally, the primary connector is a primary loading bed connector for rigidly connecting the loading bed of the first trailer module to a loading bed of a further trailer module to form a combined rigid loading bed.

In an embodiment of this variant of the trailer system according to the invention, the jack has an upper jack surface. The upper jack surface is the surface of the jack which engages the object to be jacked up or jacked down. This object can for example be the object to be transported or a jack cassette of the jack system. The upper jack surface is retractable to a position below the level of the upper surface of the loading bed of the first trailer module or at the same level as the upper surface of the loading bed of the first trailer module.

This embodiment offers a very compact design. As the upper jack surface can be retracted to or even below the upper surface of the loading bed, the jack system does not add any height to the trailer system, allowing the trailer system to be arranged below objects which are positioned at a relatively low position, e.g. 1.5 meters above ground level.

In an embodiment of this variant the trailer system according to the invention, the jack system further comprises a jack cassette. Optionally, the jack system comprises a plurality of jack cassettes. The jack cassettes are used to lift (or lower) an object over a larger length than the length of the stroke of the jack. The jack is adapted to lift a first jack cassette over the length of its stroke, so the jack is moved to its extended position while it engages the first jack cassette. Then the first jack cassette is fixed in position, and the jack retracts to its retracted position. A second jack cassette is arranged on top of the jack surface, and while the first jack cassette continues to be supported, the fixing of the first jack cassette is released. The jack then lifts the second jack cassette, and the first jack cassette moves upwards along with the second jack cassette. This process is then repeated until the first jack cassette reaches its required height. To lower the first jack cassette again, the steps are carried out in the reverse order.

In this embodiment, the jack has an upper jack surface which is moveable between a retracted position and an extended position The jack holder has an opening which allows to insert a jack cassette on the upper jack surface when the upper jack surface is in its retracted position. The opening is for example arranged in a side or in a bottom of the jack holder.

Optionally, the retracted position of the upper jack surface is located below the level of the upper surface of the loading bed of the first trailer module.

In an embodiment of this variant of the trailer system according to the invention, the first trailer module further comprises a power unit (in the art also known as a power pack) which is adapted to control the rotation of the wheels of the first trailer module. The power unit is arranged on the first trailer module on a side opposite to where the first jack cradle is connected to the first trailer module.

Optionally in this embodiment, the trailer module comprises a secondary connector. The secondary loading bed connector is arranged below an upper surface of the loading bed of the first trailer module. The secondary connector is arranged at an opposite side of the loading bed with respect to the primary connector. Optionally, the power unit is connected to the trailer module by the secondary connector.

Optionally, the power unit is configured to control the rotation of the wheels of the first trailer module. Optionally, the power unit is configured to control the rotation of the wheels of the first trailer module around a horizontal axis of rotation as well as around a vertical axis of rotation. Optionally, the power unit is configured to separately control the rotation of each of the plurality of wheels of the first trailer module separately. Optionally, the power unit is configured to separately control the rotation of each one of the plurality of wheels of the first trailer module around a horizontal axis of rotation and about a vertical axis of rotation.

Optionally, the power unit is configured to control the rotational speed of each wheel around its horizontal axis of rotation.

Optionally, a further trailer module is connected to the first trailer module, either directly or on the opposite side of the jack cradle with respect to the side on which the first trailer module is connected to the jack cradle. Optionally, the power unit is configured to control the rotation of the wheels of the first trailer module and of the further trailer module. Optionally, the power unit is configured to control the rotation of the wheels of the first trailer module and the further trailer module around a horizontal axis of rotation as well as around a vertical axis of rotation. Optionally, the power unit is configured to separately control the rotation of each of the plurality of wheels of the first trailer module and the further trailer module separately. Optionally, the power unit is configured to separately control the rotation of each one of the plurality of wheels of the first trailer module and of the further trailer module around a horizontal axis of rotation and about a vertical axis of rotation. Optionally, the power unit is configured to control the rotational speed of each wheel around its horizontal axis of rotation.

Optionally, the power unit comprises a hydraulic system for controlling the rotation of at least one wheel, optionally for controlling the rotation of all wheels of a single trailer module, optionally for controlling the rotation of all wheels of all trailer modules in the trailer system.

Optionally, the power unit is configured to control the jack of the jack system.

The invention further pertains to a method for transporting an object by a trailer system, which method comprises the following steps:

connecting a first jack system to a first trailer module to form a trailer system, wherein first trailer module comprises:

a plurality of wheels, a loading bed, a primary loading bed connector for rigidly connecting the loading bed of the first trailer module to—a loading bed of a further trailer module to form a combined rigid loading bed, which primary loading bed connector is arranged below an upper surface of the loading bed of the first trailer module, and wherein the first jack system comprises a first jack cradle, which first jack cradle comprises:

a jack holder, and a jack which is accommodated in the jack holder, the jack having an upper jack surface, a primary cradle connector, wherein the jack holder of the first jack cradle extends at least partly below the upper surface of the loading bed of the of the first trailer module, wherein the primary cradle connector is connected to the primary loading bed connector of the first trailer module to effect the connection of the first jack cradle to the first trailer module, positioning an upper jack surface of the jack at a position below the level of the upper surface of the loading bed of the first trailer module or at the same level as the upper surface of the loading bed of the first trailer module, positioning the loading bed of the first trailer module below the object to be transported, moving the upper jack surface upwards until the jack system engages the object, rotating the wheels of the first trailer module to move the trailer system and the object to a destination.

Optionally, in this method, a trailer system according to the invention is used.

In an embodiment, the method according to the invention further comprises, after moving the upper jack surface upwards until the jack system engages the object, the step of arranging the object on the loading bed of the first trailer module. This step involves the lowering of the upper surface of the jack.

In an embodiment, the method according to the invention further comprises, after moving the trailer system and the object to a destination, the step of moving the object upwards and/or downwards by the jack system.

In an embodiment, in the method according to the invention, the step of moving the upper jack surface upwards until the jack system engages the object includes:

arranging a first jack cassette above the upper jack surface, moving the upper jack surface upwards, thereby lifting the first jack cassette to a first elevated position, supporting the first jack cassette in the first elevated position, moving the upper jack surface downwards, while maintaining the first jack cassette in the first elevated position, arranging a second jack cassette above the upper jack surface and below the first jack cassette, moving the second jack cassette to the first elevated position, thereby lifting the first jack cassette to a second elevated position above the first elevated position.

The invention further pertains to a method for transporting an object by a trailer system, which method comprises the following steps:

connecting a first jack system to a first trailer module to form a trailer system, wherein first trailer module comprises:

a plurality of wheels, a loading bed, a primary connector, which primary connector is arranged below an upper surface of the loading bed of the first trailer module, and wherein the first jack system comprises a first jack cradle, which first jack cradle comprises:

a jack holder, and a jack which is accommodated in the jack holder, the jack having an upper jack surface, a primary cradle connector, wherein the jack holder of the first jack cradle extends at least partly below the upper surface of the loading bed of the of the first trailer module, wherein the primary cradle connector is connected to the primary connector of the first trailer module to effect the connection of the first jack cradle to the first trailer module, positioning the upper jack surface of the jack at a position below the level of the upper surface of the loading bed of the first trailer module or at the same level as the upper surface of the loading bed of the first trailer module, positioning the loading bed of the first trailer module below the object to be transported, moving the upper jack surface upwards until the jack system engages the object, rotating the wheels of the first trailer module to move the trailer system and the object to a destination.

Optionally, in this method, a trailer system according to the invention is used.

The invention further pertains to a trailer jack system for moving a trailer load in vertical direction relative to a loading bed of a first trailer module, wherein the first trailer module comprises a primary loading bed connector for rigidly connecting the loading bed of the first trailer module to a loading bed of a further trailer module to form a combined rigid loading bed, which primary loading bed connector is arranged below the loading bed of the first trailer module, which trailer jack system comprises a first jack cradle, which comprises:

a jack holder, and a jack which is accommodated in the jack holder, a primary cradle connector, which is adapted to engage the primary loading bed connector of the first trailer module and therewith to connect the jack cradle to the first trailer module, wherein the jack holder of the first jack cradle extends at least partly below the primary cradle connector.

The trailer jack system can for example be used in a trailer system or in a method according to the invention.

BRIEF DESCRIPTION OF THE DRAWINGS

The invention will be described in more detail below under reference to the drawing, in which in a non-limiting manner exemplary embodiments of the invention will be shown. The drawing shows in.

US 12,691,809 B2

19

Figure 6:
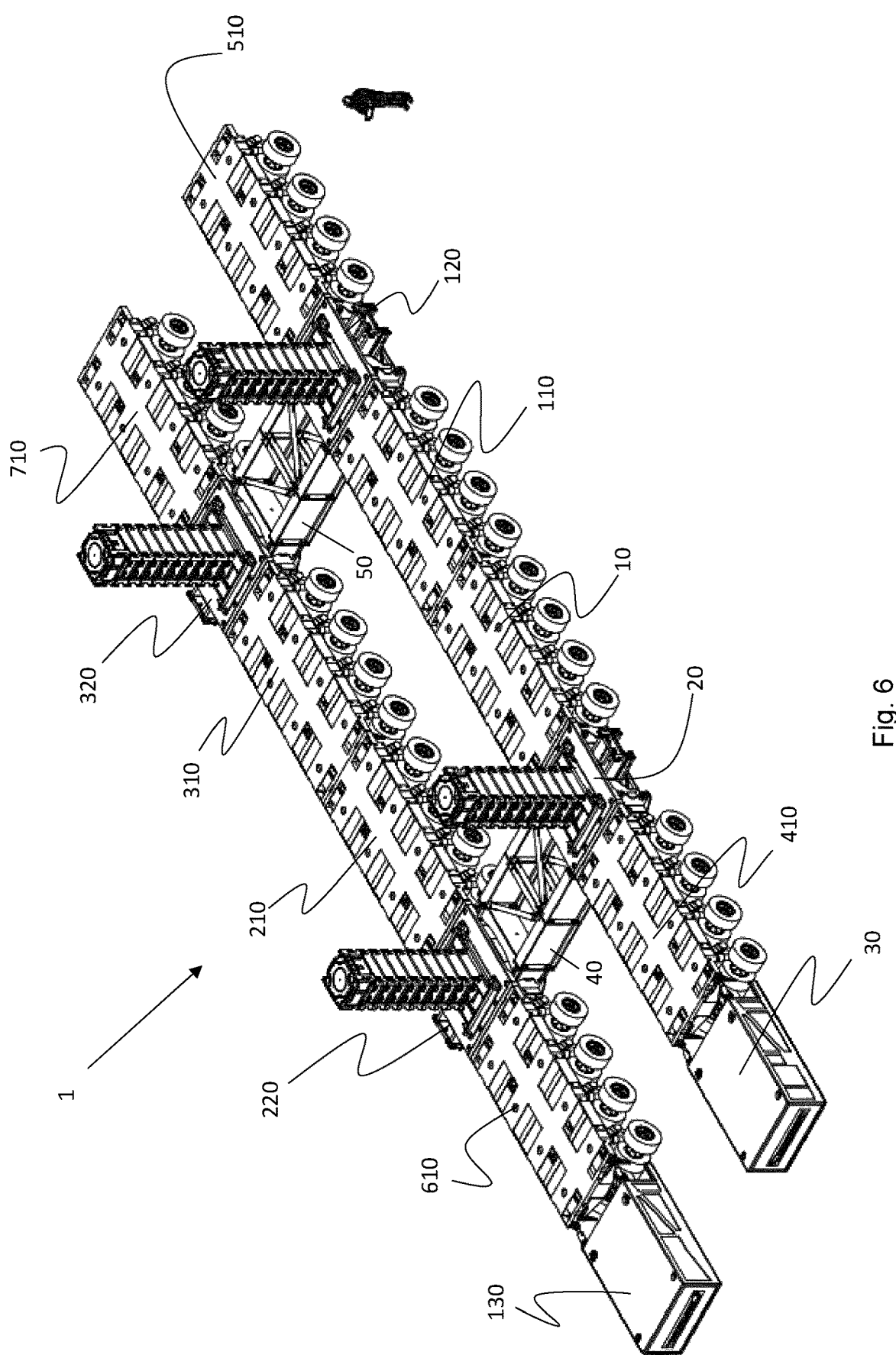
Figure 7:
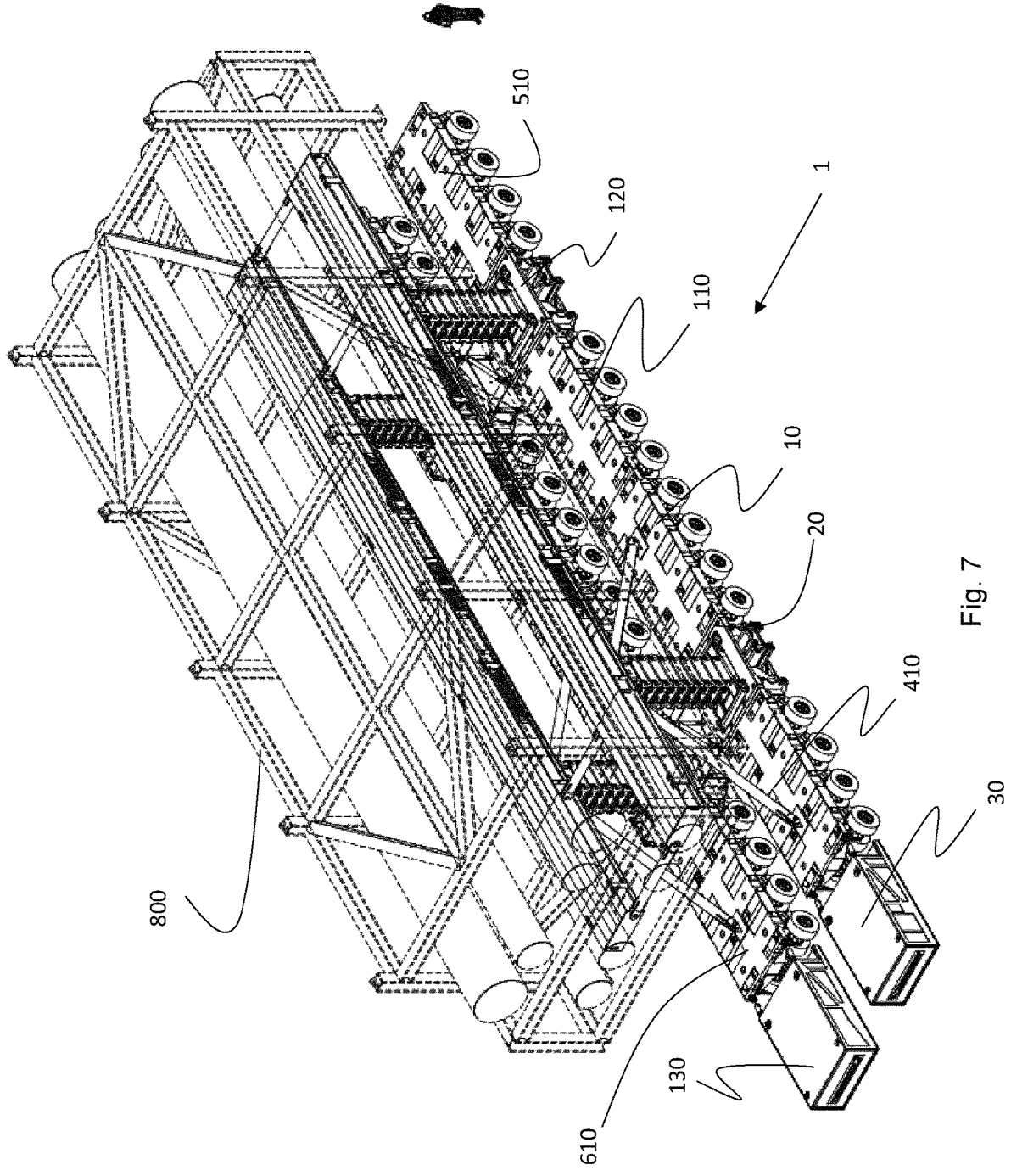
Figure 8:
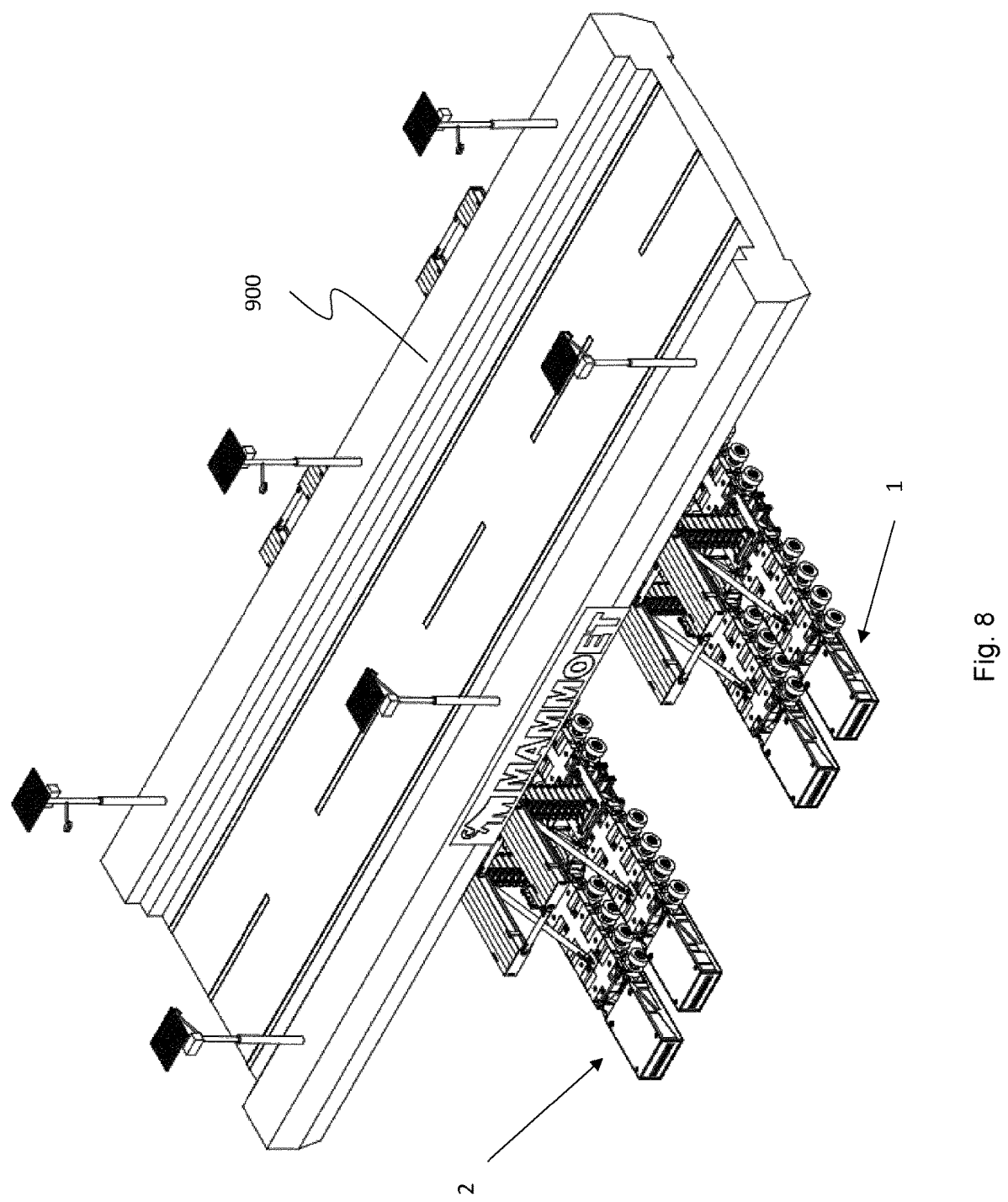

FIG. 7 schematically shows a trailer system 1 in accordance with the embodiment of FIG. 6, in use for transporting a pipe rack, FIG. 8 schematically shows two first trailer systems 1 in accordance with the embodiment of FIG. 6 in use for together transporting a bridge deck

DETAILED DESCRIPTION

Figure 1:
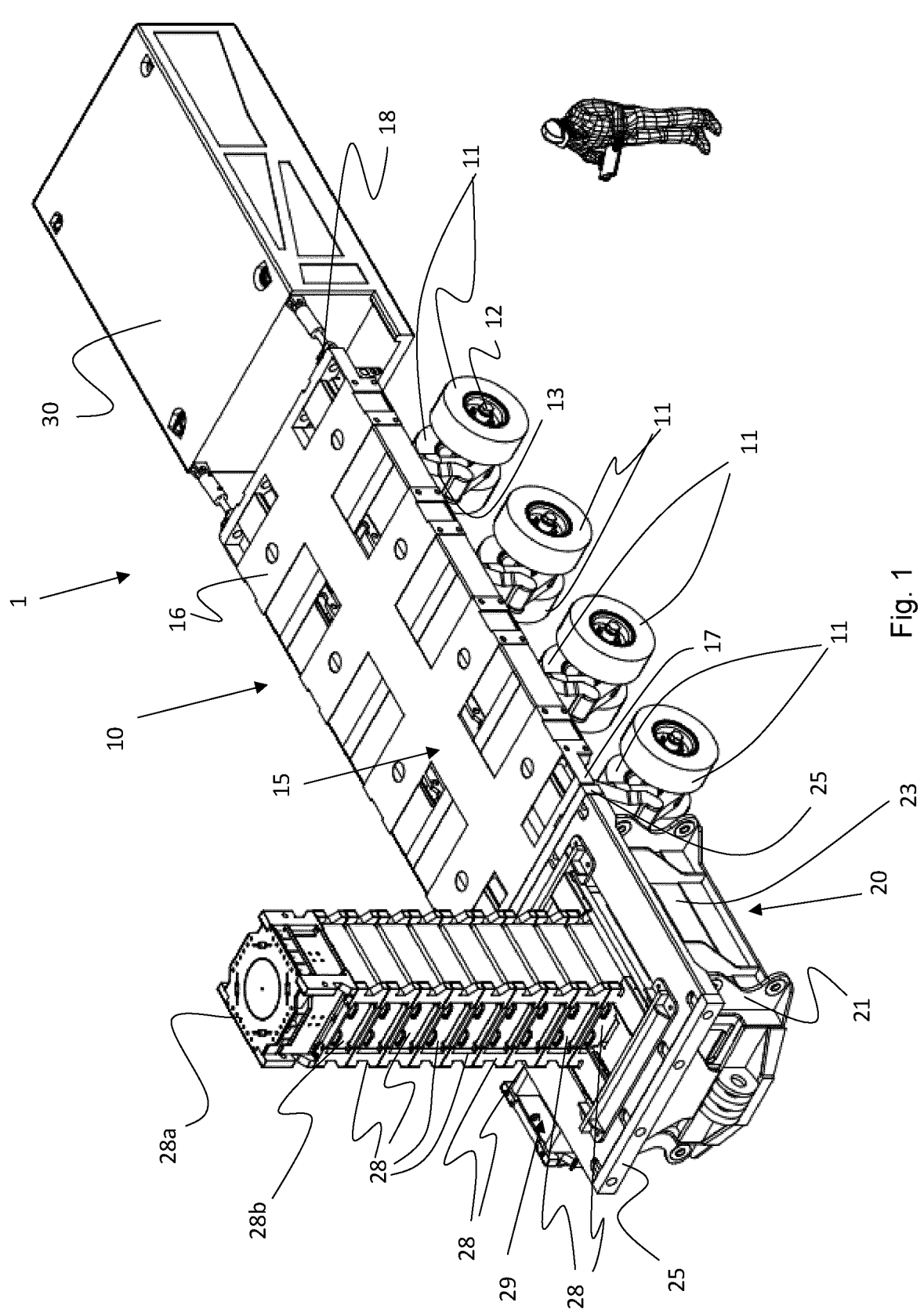
FIG. 1 schematically shows a first embodiment of a trailer system according to the invention, FIG. 2 schematically shows an embodiment of a jack cradle as can be used in the invention, FIG. 3 schematically shows an embodiment of a trailer jack system according to the invention, which can also be used as a jack system in a trailer system according to the invention and in the method for transporting an object in accordance with the invention, FIG. 4 schematically shows a second embodiment of a trailer system 1 according to the invention, FIG. 5 schematically shows a third embodiment of a trailer system 1 according to the invention, FIG. 6 schematically shows a fourth embodiment of a trailer system 1 according to the invention.

FIG. 1 schematically shows a first embodiment of a trailer system 1 according to the invention.

The trailer system 1 of FIG. 1 comprises a first trailer module 10. In this embodiment, the first trailer module 10 is a trailer module of a self-propelled modular trailer (SPMT) system.

The first trailer module 10 comprises a plurality of wheels 11. Optionally, at least some of the wheels 11—and optionally all of the wheels 11—are rotatable around a horizontal axis 12 and also pivotable or rotatable around a vertical axis 13. Optionally the position of each wheel 11 around its vertical axis of rotation 13 can be controlled individually, so that the first trailer module 10 is able to move in all directions over the surface onto which it is located.

Optionally, the rotational speed of each wheel 11 around its horizontal axis of rotation 12 can be controlled individually.

In this embodiment, the wheels 11 are grouped in pairs, and the rotation around the horizontal axis 12 and/or around the vertical axis 13 is controlled per pair of wheels.

The first trailer module 1 further comprises a loading bed 15. Objects to be transported are to be arranged on the loading bed 15, either directly or on loading bed supports which are arranged on the loading bed 15. The loading bed has an upper surface 16.

The first trailer module 10 further comprises a primary loading bed connector 17 for rigidly connecting the loading bed 15 of the first trailer module 10 to a loading bed of a further trailer module to form a combined rigid loading bed. The primary loading bed connector 17 is arranged below the upper surface 16 of the loading bed 15 of the first trailer module 10.

The trailer system according to FIG. 1 further comprises a first jack system 20. The first jack system 20 comprises a first jack cradle 21.

The first jack cradle 21 comprises a jack holder 22 (see FIG. 2) and a jack 23. The jack 23 is accommodated in the jack holder 22.

The first jack cradle 21 further comprises a primary cradle connector 25, which is connected to the primary loading bed connector 17 of the first trailer module. Therewith the primary cradle connector 25 connects the first jack cradle 21 to the first trailer module 10.

The jack holder 22 extends at least partly below the upper surface 16 of the loading bed 15 of the of the first trailer module 10. The jack holder 22 also at least partly extends below the primary cradle connector 25. In this embodiment, the jack 23 is located below the upper surface 16 of the loading bed 15, and also below the primary loading bed connector 17 and below the primary cradle connector 25.

In the embodiment of FIG. 1, the first jack cradle 21 further comprises a secondary cradle connector 26, to allow to attach further trailer modules and/or jack systems to the trailer system of FIG. 1.

As can be seen in FIG. 1, the loading bed 15 of the first trailer module 10 has a long side and a first short side, and the first jack system 20 is connected to the first short side of the loading bed 15 of the first trailer module 10. The first jack system 20 does not extend beyond the width of the loading bed 15 of the first trailer module 10, so the width of the first jack system 20 extends entirely between a first longitudinal end and a second longitudinal end (which is opposite to the first longitudinal end) of the first short side of the loading bed 15 of the first trailer module 10. The first jack system 20 may extend above and/or below the first short side of the loading bed 15 of the first trailer module 10. In the embodiment of FIG. 1, the first jack cradle 21 does not extend beyond the width of the loading bed 15 of the first trailer module 10. So, the width of the first jack cradle 21 extends entirely between a first longitudinal end and a second longitudinal end (which is opposite to the first longitudinal end) of the first short side of the loading bed 15 of the first trailer module 10. The first jack cradle 21 may extend above and/or below the first short side of the loading bed 15 of the first trailer module 10.

In the embodiment of FIG. 1, the jack system 20 further comprises a plurality of jack cassettes 28. The jack cassettes 28 are used to lift (or lower) an object over a larger length than the length of the stroke of the jack 23. The jack 23 is adapted to lift a first jack cassette 28a over the length of its stroke into a first position into a first elevated position. So, the jack 23 is moved into an extended position while it engages the first jack cassette 28. Then, the first jack cassette is supported in the first elevated position, and the jack 23 retracts to its retracted position. A second jack cassette 28b is arranged on top of the jack surface, and the first jack cassette 28a continues to be supported in the first elevated position. The jack 23 then lifts the second jack cassette 28b into the first elevated position, and the first jack cassette 28a moves upwards along with the second jack cassette 28b. This process is repeated until the first jack cassette 28a reaches its required height. To lower the first jack cassette 28a again, the steps are carried out in the reverse order.

Figure 2:
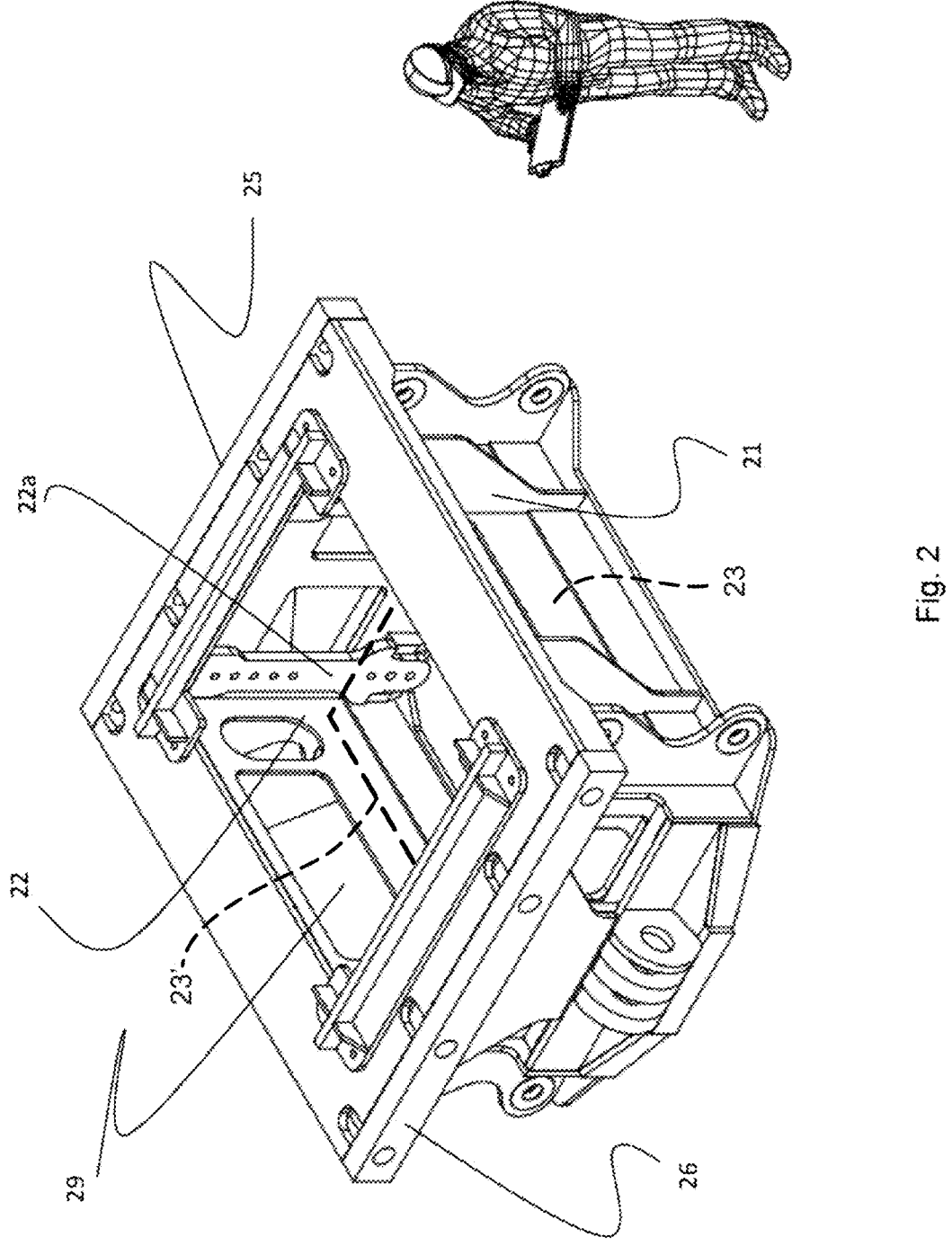

In this embodiment, the jack 23 has an upper jack surface (23'; FIG. 2) which is moveable between a retracted position and an extended position The jack holder 22 has an opening 29 which allows to insert a jack cassette 28, 28a, 28b on the upper jack surface 23' when the upper jack surface 23' is in its retracted position. The opening 29 is for example arranged in a side or in a bottom of the jack holder 22.

In the embodiment of FIG. 1, the first trailer module 10 further comprises a power unit 30 which is adapted to control the rotation of the wheels 11 of the first trailer module. The power unit 30 is arranged on the first trailer module 10 on a side opposite to where the first jack cradle 21 is connected to the first trailer module 10.

In this embodiment, the trailer module 10 comprises a secondary loading bed connector 18 for rigidly connecting the loading bed of the first trailer module 10 to a loading bed of a second further trailer module to form a combined rigid loading bed. The secondary loading bed connector 18 is arranged below the upper surface 16 of the loading bed 15 of the first trailer module 10. The secondary loading bed connector 18 is arranged at an opposite side of the loading bed 15 with respect to the primary loading bed connector 17. The power unit 30 is in this embodiment connected to the trailer module 10 by the secondary loading bed connector 18.

Optionally, the power unit 30 is configured to control the rotation of the wheels 11 of the first trailer module 10. Optionally, the power unit 30 is configured to control the rotation of the wheels 11 of the first trailer module 10 around a horizontal axis of rotation 12 as well as around a vertical axis of rotation 13. Optionally, the power unit 30 is configured to separately control the rotation of each of the plurality of wheels 11 of the first trailer module 10 separately. Optionally, the power unit 30 is configured to separately control the rotation of each one of the plurality of wheels 11 of the first trailer module 10 around a horizontal axis of rotation 12 and about a vertical axis of rotation 13. Optionally, the power unit 30 is configured to control the rotational speed of each wheel 11 around its horizontal axis of rotation 12.

Optionally, the power unit 30 comprises a hydraulic system for controlling the rotation of at least one wheel 11, optionally for controlling the rotation of all wheels 11 of the first trailer module 30.

Optionally, the power unit 30 is also adapted to control the jack 23 of the jack system 20.

FIG. 2 schematically shows an embodiment of a jack cradle 21 as can be used in the invention.

The jack cradle 21 comprises a jack holder 22 which is adapted to accommodate a jack 23 (see FIG. 1). The jack holder 22 comprises a space into which a jack can be arranged. In the embodiment of FIG. 2, in the jack holder 22 mounting elements 22a are arranged to which the jack can be fixed inside the jack holder 22.

The jack holder 22 has an opening 29 which allows to insert a jack cassette on an upper jack surface 23' of a jack 23 which is arranged in the jack holder 22, when the upper jack surface 23' is in its retracted position as shown. The opening 29 is in the embodiment arranged in a side of the jack holder 22.

The jack cradle 21 further comprises a primary cradle connector 25, which is connectable to the primary loading bed connector 17 of the first trailer module. Therewith the primary cradle connector 25 is adapted to connect the first jack cradle 21 to the first trailer module 10.

The jack holder 22 extends below the primary cradle connector 25.

In the embodiment of FIG. 2, the first jack cradle 21 further comprises a secondary cradle connector 26, to allow to attach further trailer modules and/or jack systems.

The jack cradle 21 as is shown in FIG. 2, can be applied in any of the jack systems as described above or below.

Figure 3:
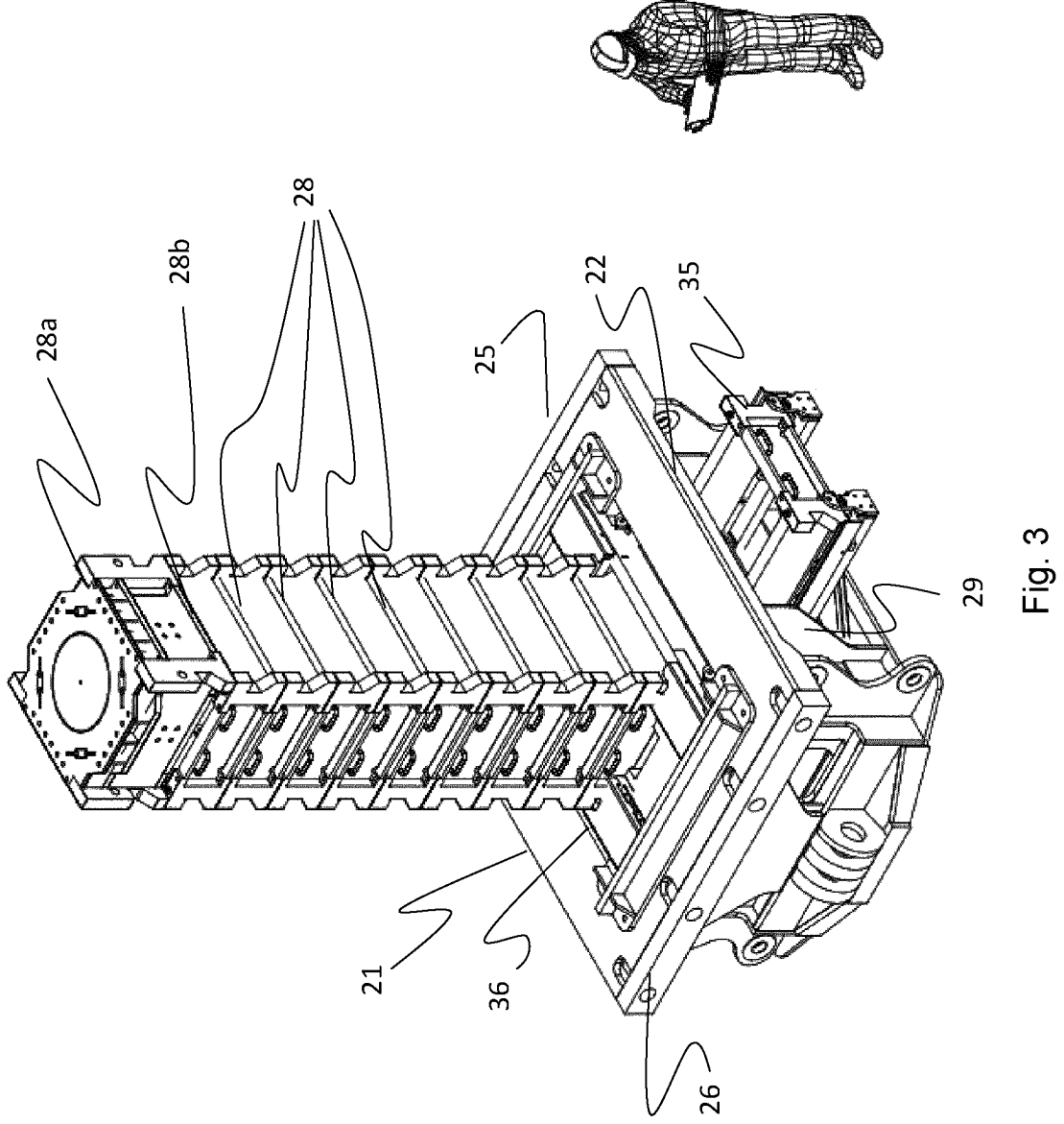

FIG. 3 schematically shows an embodiment of a trailer jack system according to the invention, which can also be used as a jack system in a trailer system according to the invention and in the method for transporting an object in accordance with the invention.

The trailer jack system of FIG. 3 can be used as jack system 20 in a trailer system according to the invention and in the method for transporting an object in accordance with the invention, comprises a jack cradle 21.

The jack cradle 21 comprises a jack holder 22 which is adapted to accommodate a jack 23 (see FIG. 1). The jack holder 22 comprises a space into which a jack can be arranged.

The trailer jack system further comprises a plurality of jack cassettes 28, 28a, 28b.

The jack cassettes 28 are used to lift (or lower) an object over a larger length than the length of the stroke of the jack 23. The jack 23 is adapted to lift a first jack cassette 28a over the length of its stroke into a first position into a first elevated position. So, the jack 23 is moved into an extended position while it engages the first jack cassette 28. Then, the first jack cassette is supported in the first elevated position, and the jack 23 retracts to its retracted position. A second jack cassette 28b is arranged on top of the jack surface, and the first jack cassette 28a continues to be supported in the first elevated position. The jack 23 then lifts the second jack cassette 28b into the first elevated position, and the first jack cassette 28a moves upwards along with the second jack cassette 28b. This process is repeated until the first jack cassette 28a reaches its required height. To lower the first jack cassette 28a again, the steps are carried out in the reverse order.

The jack holder 22 has an opening 29 which allows to insert a jack cassette 28a, 28b, 28 on an upper jack surface (23') of a jack (23) which is arranged in the jack holder 22, when the upper jack surface (23') is in its retracted position. The opening 29 is in the embodiment arranged in a side of the jack holder 22.

In the embodiment of FIG. 3, the trailer jack system further comprises a feeder mechanism 35, which is adapted to insert a jack cassette 28 into the opening 29 and to arrange it above the upper jack surface (23').

In this embodiment, the trailer jack system further comprises a support mechanism 36 which is adapted to support a jack cassette 28a or a stack of jack cassettes 28, 28a, 28b.

When the jack cassette 28a or stack of jack cassettes 28, 28a, 28b needs to be raised or lowered relative to the jack cradle 21, the support mechanism 36 releases the jack cassette 28a or stack of jack cassettes 28, 28a, 28b to allow the desired movement up or down. When the jack cassette 28a or stack of jack cassettes 28, 28a, 28b is brought into the desired position by the jack again, the support mechanism 36 engages the jack cassette 28a or stack of jack cassettes 28, 28a, 28b again.

The jack cradle 21 further comprises a primary cradle connector 25, which is connectable to the primary loading bed connector 17 of the first trailer module. Therewith the primary cradle connector 25 is adapted to connect the first jack cradle 21 to the first trailer module 10.

The jack holder 22 extends below the primary cradle connector 25.

In the embodiment of FIG. 3, the first jack cradle 21 further comprises a secondary cradle connector 26, to allow to attach further trailer modules and/or jack systems.

Figure 4:
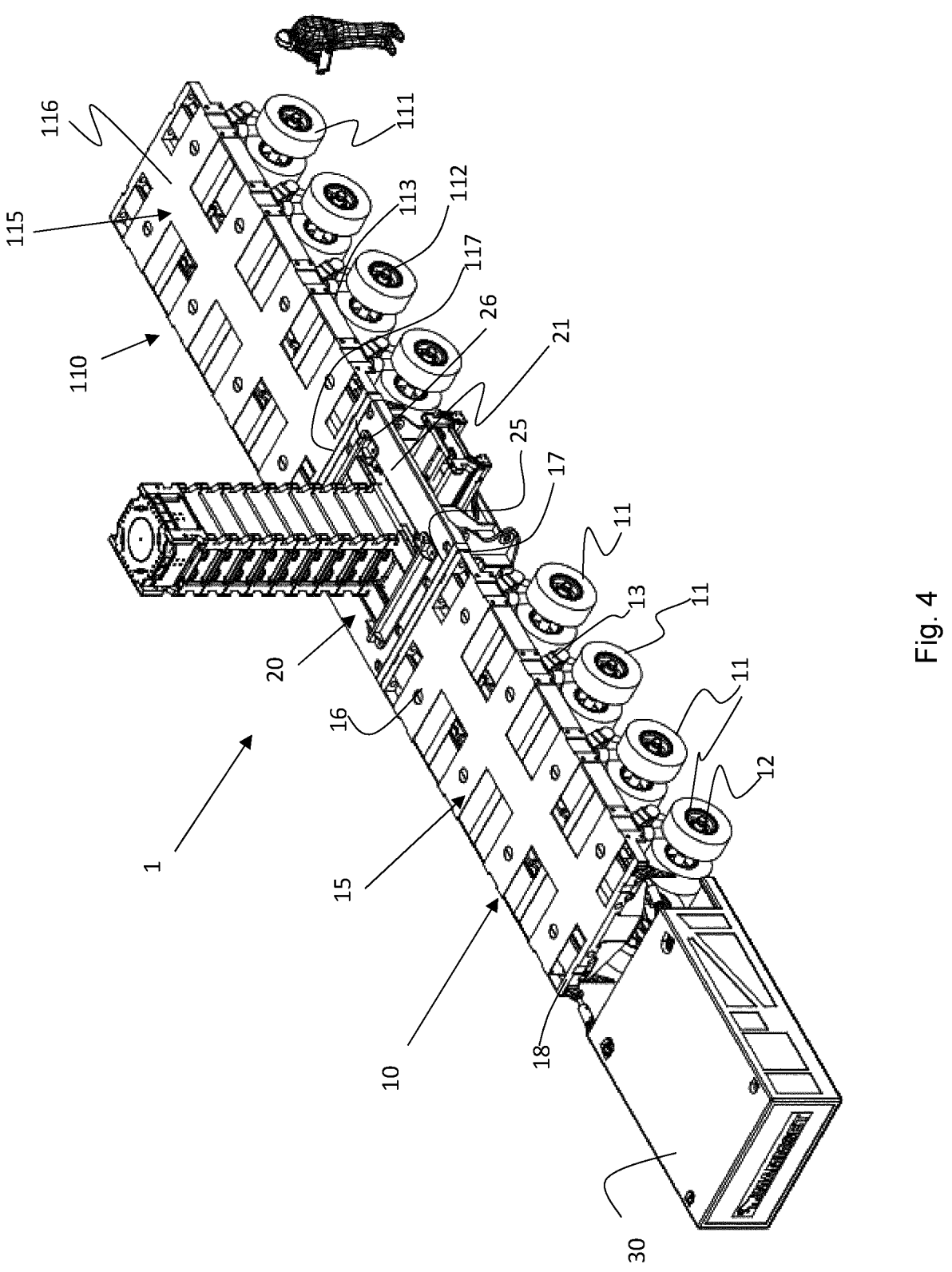

FIG. 4 schematically shows a second embodiment of a trailer system 1 according to the invention. In the embodiment of FIG. 4, the trailer system contains the following array: first trailer module 10—first jack system 20—second trailer module 110.

The trailer system 1 of FIG. 4 comprises a first trailer module 10. In this embodiment, the first trailer module 10 is a trailer module of a self-propelled modular trailer (SPMT) system.

The first trailer module 10 comprises a plurality of wheels 11. Optionally, at least some of the wheels 11—and optionally all of the wheels 11—are rotatable around a horizontal axis 12 and also pivotable or rotatable around a vertical axis 13. Optionally the position of each wheel 11 around its vertical axis of rotation 13 can be controlled individually, so that the first trailer module 10 is able to move in all directions over the surface onto which it is located.

Optionally, the rotational speed of each wheel 11 around its horizontal axis of rotation 12 can be controlled individually.

In this embodiment, the wheels 11 are grouped in pairs, and the rotation around the horizontal axis 12 and/or around the vertical axis 13 is controlled per pair of wheels.

The first trailer module 1 further comprises a loading bed 15. Objects to be transported are to be arranged on the loading bed 15, either directly or on loading bed supports which are arranged on the loading bed 15. The loading bed has an upper surface 16.

The first trailer module 10 further comprises a primary loading bed connector 17 for rigidly connecting the loading bed 15 of the first trailer module 10 to a loading bed of a further trailer module to form a combined rigid loading bed. The primary loading bed connector 17 is arranged below the upper surface 16 of the loading bed 15 of the first trailer module 10.

The trailer system according to FIG. 4 further comprises a first jack system 20. The first jack system 20 comprises a first jack cradle 21. The first jack system 20 is for example a jack system in accordance with FIG. 3.

The first jack cradle 21 comprises a jack holder 22 (see FIG. 2) and a jack 23. The jack 23 is accommodated in the jack holder 22.

The first jack cradle 21 further comprises a primary cradle connector 25, which is connected to the primary loading bed connector 17 of the first trailer module. Therewith the primary cradle connector 25 connects the first jack cradle 21 to the first trailer module 10.

The jack holder 22 extends at least partly below the upper surface 16 of the loading bed 15 of the of the first trailer module 10. The jack holder 22 also at least partly extends below the primary cradle connector 25. In this embodiment, the jack 23 is located below the upper surface 16 of the loading bed 15, and also below the primary loading bed connector 17 and below the primary cradle connector 25.

As can be seen in FIG. 4, the loading bed 15 of the first trailer module 10 has a long side and a first short side, and the first jack system 20 is connected to the first short side of the loading bed 15 of the first trailer module 10. The first jack system 20 does not extend beyond the width of the loading bed 15 of the first trailer module 10, so the width of the first jack system 20 extends entirely between a first longitudinal end and a second longitudinal end (which is opposite to the first longitudinal end) of the first short side of the loading bed 15 of the first trailer module 10. The first jack system 20 may extend above and/or below the first short side of the loading bed 15 of the first trailer module 10. In the embodiment of FIG. 4, the first jack cradle 21 does not extend beyond the width of the loading bed 15 of the first trailer module 10. So, the width of the first jack cradle 21 extends entirely between a first longitudinal end and a second longitudinal end (which is opposite to the first longitudinal end) of the first short side of the loading bed 15 of the first trailer module 10. The first jack cradle 21 may extend above and/or below the first short side of the loading bed 15 of the first trailer module 10.

In the embodiment of FIG. 4, the first trailer module 10 further comprises a power unit 30 which is adapted to control the rotation of the wheels 11 of the first trailer module. The power unit 30 is arranged on the first trailer module 10 on a side opposite to where the first jack cradle 21 is connected to the first trailer module 10.

In this embodiment, the trailer module 10 comprises a secondary loading bed connector 18 for rigidly connecting the loading bed of the first trailer module 10 to a loading bed of a second further trailer module to form a combined rigid loading bed. The secondary loading bed connector 18 is arranged below the upper surface 16 of the loading bed 15 of the first trailer module 10. The secondary loading bed connector 18 is arranged at an opposite side of the loading bed 15 with respect to the primary loading bed connector 17. The power unit 30 is in this embodiment connected to the trailer module 10 by the secondary loading bed connector 18.

Optionally, the power unit 30 is configured to control the rotation of the wheels 11 of the first trailer module 10. Optionally, the power unit 30 is configured to control the rotation of the wheels 11 of the first trailer module 10 around a horizontal axis of rotation 12 as well as around a vertical axis of rotation 13. Optionally, the power unit 30 is configured to separately control the rotation of each of the plurality of wheels 11 of the first trailer module 10 separately. Optionally, the power unit 30 is configured to separately control the rotation of each one of the plurality of wheels 11 of the first trailer module 10 around a horizontal axis of rotation 12 and about a vertical axis of rotation 13. Optionally, the power unit 30 is configured to control the rotational speed of each wheel 11 around its horizontal axis of rotation 12.

Optionally, the power unit 30 comprises a hydraulic system for controlling the rotation of at least one wheel 11, optionally for controlling the rotation of all wheels 11 of the first trailer module 30.

In the embodiment of FIG. 4, the trailer system further comprises a second trailer module 110. In this embodiment, the second trailer module 110 is a trailer module of a self-propelled modular trailer (SPMT) system.

The second trailer module 110 comprises a plurality of wheels 111. Optionally, at least some of the wheels 111—and optionally all of the wheels 111—are rotatable around a horizontal axis 112 and also pivotable or rotatable around a vertical axis 113. Optionally the position of each wheel 111 around its vertical axis of rotation 113 can be controlled individually, so that the second trailer module 110 is able to move in all directions over the surface onto which it is located. Optionally, the rotational speed of each wheel 111 around its horizontal axis of rotation 112 can be controlled individually.

In this embodiment, the wheels 111 are grouped in pairs, and the rotation around the horizontal axis 112 and/or around the vertical axis 113 is controlled per pair of wheels.

The second trailer module 110 further comprises a loading bed 115. Objects to be transported are to be arranged on the loading bed 115, either directly or on loading bed supports which are arranged on the loading bed 115. The loading bed has an upper surface 116.

The second trailer module 110 further comprises a primary loading bed connector 117 for rigidly connecting the loading bed 115 of the second trailer module 110 to a loading bed of a further trailer module to form a combined rigid loading bed. The primary loading bed connector 117 is arranged below the upper surface 116 of the loading bed 115 of the second trailer module 110.

The first jack cradle 21 comprises a secondary cradle connector 26, which is connected to the primary loading bed connector 117 of the second trailer module 110 and therewith connects the first jack cradle 21 to the second trailer module 110.

Therewith, the first jack cradle 21 is arranged between the first trailer module 10 and the second trailer module 110.

Optionally, further trailer modules and/or further jack systems and/or power units may be present in this embodiment of the trailer system.

Figure 5:
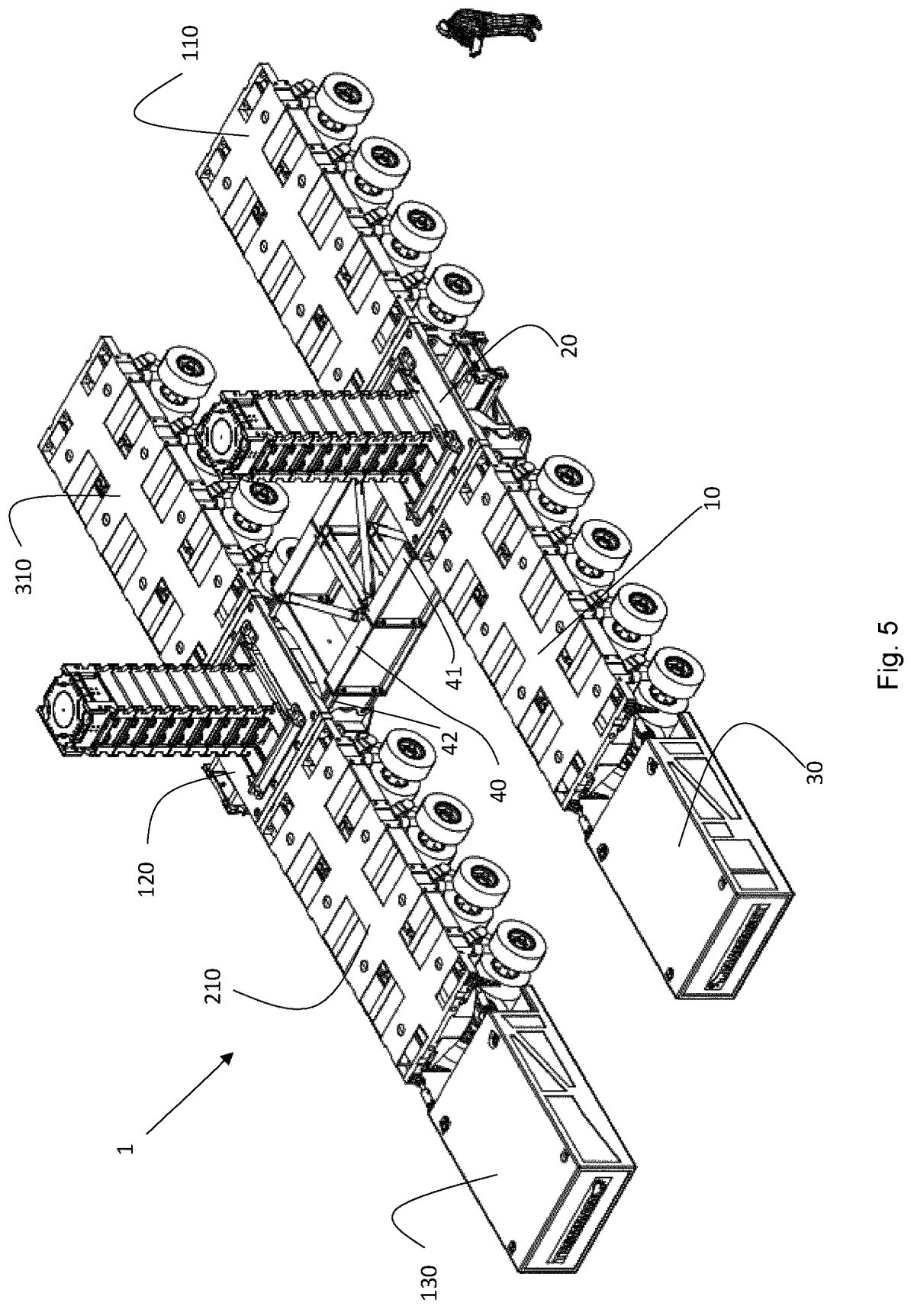

FIG. 5 schematically shows a third embodiment of a trailer system 1 according to the invention. In the embodiment of FIG. 5, the trailer system contains two arrays. The first array comprises: first trailer module 10—first jack system 20—second trailer module 110. The second array comprises: third trailer module 210—second jack system 120—fourth trailer module 310.

The first jack system 20 and the second jack system 120 are for example jack systems in accordance with FIG. 3.

The first and the second array are connected to each other by a first connector beam 40. The first connector beam 40 has a first end 41 which is connected to the jack cradle of the first jack system 20 and a second end 42 which is connected to the jack cradle of the second jack 120. In the embodiment of FIG. 5, the first connector beam 40 is a lattice beam.

In the embodiment of FIG. 5, the first trailer module 10 is for example of the same type as the first trailer module 10 in the embodiment of FIG. 4.

In the embodiment of FIG. 5, the second trailer module 110 is for example of the same type as the second trailer module 110 in the embodiment of FIG. 4.

In the embodiment of FIG. 5, the third trailer module 210 is for example of the same type as the first trailer module 10 in the embodiment of FIG. 4.

In the embodiment of FIG. 5, the fourth trailer module 310 is for example of the same type as the second trailer module 110 in the embodiment of FIG. 4.

In the embodiment of FIG. 5, the first array is provided with power unit 30, and the second array is provided with power unit 130.

FIG. 6 schematically shows a fourth embodiment of a trailer system 1 according to the invention. In the embodiment of FIG. 6, the trailer system contains two arrays. The first array comprises: fifth trailer module 410—first jack system 20—first trailer module 10—second trailer module 110—second jack system 120—sixth trailer module 510. The second array comprises: seventh trailer module 610—third jack system 220—third trailer module 210—fourth trailer module 310—fourth jack system 320—eighth trailer module 710.

The first jack system 20, the second jack system 120, third jack system 220 and fourth jack system 320 are for example jack systems in accordance with FIG. 3.

The first and the second array are connected to each other by a first connector beam 40 and by a second connector beam 50. The first connector beam 40 has a first end which is connected to the jack cradle of the first jack system 20 and a second end which is connected to the jack cradle of the third jack 220. In the embodiment of FIG. 6, the first connector beam 40 is a lattice beam. The second connector beam 50 has a first end which is connected to the jack cradle of the second jack system 120 and a second end which is connected to the jack cradle of the fourth jack 320. In the embodiment of FIG. 6, the second connector beam 50 is a lattice beam.

In the embodiment of FIG. 6, the trailer modules 10 are for example of the same type as the first trailer module 10 and/or the second trailer module 120 in the embodiment of FIG. 4.

In the embodiment of FIG. 6, the first array is provided with power unit 30, and the second array is provided with power unit 130.

FIG. 7 shows a trailer system 1 in accordance with the embodiment of FIG. 6, in use for transporting a pipe rack 800.

FIG. 8 shows a first trailer system 1 in accordance with the embodiment of FIG. 6 and a second trailer system 1 also in accordance with the embodiment of FIG. 6, in use for together transporting a bridge deck 900.

The invention claimed is:

1. A trailer system, comprising:
   a first trailer module, wherein the first trailer module comprises a plurality of first wheels, a first loading bed, and a first primary loading bed connector, wherein the first primary loading bed connector is configured to rigidly connect the first loading bed of the first trailer module to a loading bed of any other given trailer module to form a combined rigid loading bed, wherein the first primary loading bed connector is arranged below an upper surface of the first loading bed of the first trailer module;
   a first jack system comprising a first jack cradle and a first primary cradle connector, wherein the first jack cradle comprises a first jack holder, and a first jack accommodated in the first jack holder, wherein the first primary cradle connector is connected to the first primary loading bed connector of the first trailer module and therewith connects the first jack cradle to the first trailer module, wherein the first jack holder of the first jack cradle extends at least partly below the upper surface of the first loading bed of the first trailer module; and
   a second trailer module, wherein the second trailer module comprises a plurality of second wheels, a second loading bed, and a second primary loading bed connector, wherein the second primary loading bed connector is configured to rigidly connect the second loading bed of the second trailer module to a loading bed of any other given trailer module to form a combined rigid loading bed, wherein the second primary loading bed connector is arranged below an upper surface of the second loading bed of the second trailer module,
   wherein the first jack cradle comprises a secondary cradle connector, wherein the secondary cradle connector is connected to the second primary loading bed connector of the second trailer module and therewith connects the first jack cradle to the second trailer module;
   wherein the first jack cradle is arranged between the first trailer module and the second trailer module;
   wherein the first jack system further comprises a first jack cassette;
   wherein the first jack has a first upper jack surface which is moveable between a retracted position and an extended position;
   wherein the first jack holder has a first opening which allows insertion of the first jack cassette on the first upper jack surface when the first upper jack surface is in its retracted position; and
   wherein the first upper jack surface is retractable to a position below the level of the upper surface of the first loading bed of the first trailer.

2. The trailer system according to claim 1, wherein the first jack holder extends at least partly below the first primary cradle connector.

3. The trailer system according to claim 1, wherein the retracted position of the first upper jack surface is located below the level of the upper surface of the first loading bed of the first trailer module.

4. The trailer system according to claim 1, wherein the first trailer module further comprises a power unit comprising a hydraulic system which is configured to control the rotation of at least one of the first wheels of the first trailer module, wherein the power unit is arranged on the first trailer module on a side opposite to where the first jack cradle is connected to the first trailer module.

5. The trailer system according to claim 1, wherein the trailer system further comprises:
   a third trailer module, wherein the third trailer module comprises: a plurality of third wheels, a third loading bed, and a third primary loading bed connector, wherein the third primary loading connector is configured to rigidly connect the third loading bed of the third trailer module to a loading bed of any other given trailer module to form a combined rigid loading bed, wherein the third primary loading bed connector is arranged below an upper surface of the third loading bed of the third trailer module;

a second jack system comprising a second jack cradle and a second primary cradle connector, wherein the second jack cradle comprises: a second jack holder, and a second jack accommodated in the second jack holder, wherein the second primary cradle connector is connected to the third primary loading bed connector of the third trailer module and therewith connects the second jack cradle to the third trailer module, wherein the second jack holder of the second jack cradle extends at least partly below the upper surface of the third loading bed of the third trailer module, wherein the second jack system further comprises a second jack cassette, wherein the second jack has a second upper jack surface which is moveable between a retracted position and an extended position, and wherein the second jack holder has a second opening which allows insertion of the second jack cassette on the second upper jack surface when the second upper jack surface is in the retracted position; and a first connector beam having a first end connected to the first jack cradle and having a second end connected to the second jack cradle.

6. A trailer system, comprising:

a first trailer module, wherein the first trailer module comprises a plurality of first wheels, a first loading bed, a first primary loading bed connector, and a first secondary loading bed connector, the first primary loading bed connector being configured to rigidly connect the first loading bed of the first trailer module to a loading bed of any other given trailer module to form a combined rigid loading bed, wherein the first primary loading bed connector is arranged below an upper surface of the first loading bed of the first trailer module, the first secondary loading bed connector being configured to rigidly connect the first loading bed of the first trailer module to a loading bed of any other given trailer module to form a combined rigid loading bed, wherein the first secondary loading bed connector is arranged below an upper surface of the first loading bed of the first trailer module, wherein the first secondary loading bed connector is arranged at an opposite side of the first loading bed with respect to the first primary loading bed connector;

a first jack system comprising a first jack cradle and a first primary cradle connector, wherein the first jack cradle comprises a first jack holder, and a first jack accommodated in the first jack holder, wherein the first primary cradle connector is connected to the first primary loading bed connector of the first trailer module and therewith connects the first jack cradle to the first trailer module, wherein the first jack holder of the first jack cradle extends at least partly below the upper surface of the first loading bed of the first trailer module, wherein the first jack system further comprises a first jack cassette, wherein the first jack has a first upper jack surface which is moveable between a retracted position and an extended position, and wherein the first jack holder has a first opening which allows insertion of the first jack cassette on the first upper jack surface when the first upper jack surface is in the retracted position;

a second jack system comprising a second jack cradle and a second primary cradle connector, wherein the second jack cradle comprises a second jack holder, and a second jack accommodated in the second jack holder, wherein the second primary cradle connector is connected to the first secondary loading bed connector of the first trailer module and therewith connects the second jack cradle to the first trailer module, wherein the second jack holder of the second jack cradle extends at least partly below the upper surface of the first loading bed of the first trailer module, wherein the second jack system further comprises a second jack cassette, wherein the second jack has a second upper jack surface which is moveable between a retracted position and an extended position, and wherein the second jack holder has a second opening which allows insertion of the second jack cassette on the second upper jack surface when the second upper jack surface is in the retracted position;

a second trailer module, wherein the second trailer module comprises a plurality of second wheels, a second loading bed, a second primary loading bed connector, and a second secondary loading bed connector, the second primary loading bed connector being configured to rigidly connect the second loading bed of the second trailer module to a loading bed of any other given trailer module to form a combined rigid loading bed, wherein the second primary loading bed connector is arranged below an upper surface of the second loading bed of the second trailer module, the secondary loading bed connector being configured to rigidly connect the second loading bed of the second trailer module to a loading bed of any other given trailer module to form a combined rigid loading bed, wherein the second secondary loading bed connector is arranged below an upper surface of the second loading bed of the second trailer module, wherein the second secondary loading bed connector is arranged at an opposite side of the second loading bed with respect to the second primary loading bed connector;

a third jack system comprising a third jack cradle and a third primary cradle connector, wherein the third jack cradle comprises a third jack holder, and a third jack accommodated in the third jack holder, wherein the third primary cradle connector is connected to the second primary loading bed connector of the second trailer module and therewith connects the third jack cradle to the second trailer module, wherein the third jack holder of the third jack cradle extends at least partly below the upper surface of the second loading bed of the second trailer module, wherein the third jack system further comprises a third jack cassette, wherein the third jack has a third upper jack surface which is moveable between a retracted position and an extended position, and wherein the third jack holder has a third opening which allows insertion of the third jack cassette on the third upper jack surface when the third upper jack surface is in the retracted position;

a fourth jack system comprising a fourth jack cradle and a fourth primary cradle connector, wherein the fourth jack cradle comprises a fourth jack holder, and a fourth jack accommodated in the fourth jack holder, wherein the fourth primary cradle connector is connected to the secondary loading bed connector of the second trailer module and therewith connects the fourth jack cradle to the second trailer module, wherein the fourth jack holder of the fourth jack cradle extends at least partly below the upper surface of the second loading bed of the second trailer module, wherein the fourth jack system further comprises a fourth jack cassette, wherein the fourth jack has a fourth upper jack surface which is moveable between a retracted position and an extended position, and wherein the fourth jack holder has a fourth opening which allows insertion of the fourth jack cassette on the fourth upper jack surface when the fourth upper jack surface is in the retracted position;

a first connector beam having a first end connected to the first jack cradle and having a second end connected to the third jack cradle; and a second connector beam having a first end connected to the second jack cradle and having a second end connected to the fourth jack cradle, wherein the trailer system comprises a first array comprising the first jack system, the first trailer module, and the second jack system;

wherein the trailer system comprises a second array comprising the third jack system, the second trailer module, and the further jack system;

wherein further trailer modules are present in at least one of the arrays; and wherein the jacks of the first, second, third and fourth jack system have the respective upper jack surface, which upper jack surface is retractable to a position below the level of the upper surface of the loading bed of the first and second trailer module.

7. A trailer system, comprising:

a first trailer module, wherein the first trailer module comprises a plurality of first wheels, a first loading bed, a first primary loading bed connector, and a first secondary loading bed connector, the first primary loading bed connector being configured to rigidly connect the first loading bed of the first trailer module to a loading bed of any other given trailer module to form a combined rigid loading bed, wherein the first primary loading bed connector is arranged below an upper surface of the first loading bed of the first trailer module, the first secondary loading bed connector being configured to rigidly connect the first loading bed of the first trailer module to a loading bed of any other given trailer module to form a combined rigid loading bed, wherein the first secondary loading bed connector is arranged below an upper surface of the first loading bed of the first trailer module, wherein the first secondary loading bed connector is arranged at an opposite side of the first loading bed with respect to the first primary loading bed connector;

a first jack system comprising a first jack cradle and a first primary cradle connector, wherein the first jack cradle comprises a first jack holder, and a first jack accommodated in the first jack holder, wherein the first primary cradle connector is connected to the first primary loading bed connector of the first trailer module and therewith connects the first jack cradle to the first trailer module, wherein the first jack holder of the first jack cradle extends at least partly below the upper surface of the first loading bed of the first trailer module, wherein the first jack system further comprises a first jack cassette, wherein the first jack has a first upper jack surface which is moveable between a retracted position and an extended position, and wherein the first jack holder has a first opening which allows insertion of the first jack cassette on the first upper jack surface when the first upper jack surface is in the retracted position;

a second trailer module, wherein the second trailer module comprises a plurality of second wheels, a second loading bed, a second primary loading bed connector, and a second secondary loading bed connector, the second primary loading bed connector being configured to rigidly connect the second loading bed of the second trailer module to a loading bed of any other given trailer module to form a combined rigid loading bed, wherein the second primary loading bed connector is arranged below an upper surface of the second loading bed of the second trailer module, the second secondary loading bed connector being configured to rigidly connect the second loading bed of the second trailer module to a loading bed of any other given trailer module to form a combined rigid loading bed, wherein the second secondary loading bed connector is arranged below an upper surface of the second loading bed of the second trailer module, wherein the second secondary loading bed connector is arranged at an opposite side of the second loading bed with respect to the second primary loading bed connector;

a second jack system comprising a second jack cradle and a second primary cradle connector, wherein the second jack cradle comprises a second jack holder, and a second jack accommodated in the second jack holder, wherein the second primary cradle connector is connected to the second primary loading bed connector of the second trailer module and therewith connects the second jack cradle to the second trailer module, wherein the second jack holder of the second jack cradle extends at least partly below the upper surface of the second loading bed of the second trailer module, wherein the first secondary loading bed connector of the first trailer module is connected to the second secondary loading bed connector of the second trailer module, wherein the second jack system further comprises a second jack cassette, wherein the second jack has a second upper jack surface which is moveable between a retracted position and an extended position, and wherein the second jack holder has a second opening which allows insertion of the second jack cassette on the second upper jack surface when the second upper jack surface is in the retracted position;

a third trailer module, wherein the third trailer module comprises a plurality of third wheels, a third loading bed, a third primary loading bed connector, and a third secondary loading bed connector, the third primary loading bed connector being configured to rigidly connect the third loading bed of the third trailer module to a loading bed of any other given trailer module to form a combined rigid loading bed, wherein the third primary loading bed connector is arranged below an upper surface of the third loading bed of the third trailer module, the third secondary loading bed connector being configured to rigidly connect the third loading bed of the third trailer module to a loading bed of any other given trailer module to form a combined rigid loading bed, wherein the third secondary loading bed connector is arranged below an upper surface of the third loading bed of the third trailer module, wherein the third secondary loading bed connector is arranged at an opposite side of the third loading bed with respect to the third primary loading bed connector;

a third jack system comprising a third jack cradle and a third primary cradle connector, wherein the third jack cradle comprises a third jack holder, and a third jack accommodated in the third jack holder, wherein the third primary cradle connector is connected to the third primary loading bed connector of the third trailer module and therewith connects the third jack cradle to the third trailer module, wherein the jack holder of the third jack cradle extends at least partly below the upper surface of the third loading bed of the third trailer module, wherein the third jack system further comprises a third jack cassette, wherein the third jack has a third upper jack surface which is moveable between a retracted position and an extended position, and wherein the third jack holder has a third opening which allows insertion of the third jack cassette on the third upper jack surface when the third upper jack surface is in the retracted position;

a fourth trailer module, wherein the fourth trailer module comprises a plurality of fourth wheels, a fourth loading bed, a fourth primary loading bed connector, and a fourth secondary loading bed connector, the fourth primary loading bed connector being configured to rigidly connect the fourth loading bed of the fourth trailer module to a loading bed of any other given module to form a combined rigid loading bed, wherein the fourth primary loading bed connector is arranged below an upper surface of the fourth loading bed of the fourth trailer module, the fourth secondary loading bed connector being configured to rigidly connect the fourth loading bed of the fourth trailer module to a loading bed of any other given trailer module to form a combined rigid loading bed, wherein the fourth secondary loading bed connector is arranged below the upper surface of the fourth loading bed of the fourth trailer module, wherein the fourth secondary loading bed connector is arranged at an opposite side of the fourth loading bed with respect to the fourth primary loading bed connector;

a fourth jack system comprising a fourth jack cradle and a fourth primary cradle connector, wherein the fourth jack cradle comprises a fourth jack holder, and a fourth jack accommodated in the fourth jack holder, wherein the fourth primary cradle connector is connected to the fourth secondary loading bed connector of the fourth trailer module and therewith connects the fourth jack cradle to the fourth trailer module, wherein the fourth jack holder of the fourth jack cradle extends at least partly below the upper surface of the fourth loading bed of the fourth trailer module, wherein the third secondary loading bed connector of the third trailer module is connected to the fourth secondary loading bed connector of the fourth trailer module, wherein the fourth jack system further comprises a fourth jack cassette, wherein the fourth jack has a fourth upper jack surface which is moveable between a retracted position and an extended position, and wherein the fourth jack holder has a fourth opening which allows insertion of the fourth jack cassette on the fourth upper jack surface when the fourth upper jack surface is in the retracted position;

a first connector beam having a first end connected to the first jack cradle and having a second end connected to the third jack cradle; and a second connector beam having a first end connected to the second jack cradle and having a second end connected to the fourth jack cradle, wherein the trailer system comprises a first array comprising the first jack system, the first trailer module, the second trailer module, and the second jack system;

wherein the trailer system comprises a second array comprising the third jack system, the third trailer module, the fourth trailer module, and the fourth jack system;

wherein further trailer modules are present in at least one of the arrays; and wherein the jacks of the first, second, third and fourth jack system have the respective upper jack surface, which upper jack surface is retractable to a position below the level of the upper surface of the loading bed of the first, second, third and fourth trailer module.

8. A method for transporting an object by a trailer system, the method comprising the steps of:

connecting a first jack system to a first trailer module to form a trailer system, wherein first trailer module comprises a plurality of first wheels, a first loading bed, and a first primary loading bed connector, the first primary loading bed connector being configured to rigidly connect the first loading bed of the first trailer module to a loading bed of any other given trailer module to form a combined rigid loading bed, wherein the first primary loading bed connector is arranged below an upper surface of the first loading bed of the first trailer module, wherein the first jack system comprises a first jack cradle and a first primary cradle connector, wherein the first jack cradle comprises a first jack holder, and a first jack accommodated in the first jack holder, the first jack having an upper jack surface, wherein the first jack holder of the first jack cradle extends at least partly below the upper surface of the first loading bed of the of the first trailer module, wherein the first primary cradle connector is connected to the first primary loading bed connector of the first trailer module to affect the connection of the first jack cradle to the first trailer module, wherein the first jack system further comprises a first jack cassette, wherein the first jack has a first upper jack surface which is moveable between a retracted position and an extended position, and wherein the first jack holder has a first opening which allows insertion of the first jack cassette on the first upper jack surface when the first upper jack surface is in the retracted position, wherein the trailer system further comprises a second trailer module, wherein the second trailer module comprises a plurality of second wheels, a second loading bed, and a second primary loading bed connector, the second primary loading bed connector being configured to rigidly connect the second loading bed of the second trailer module to a loading bed of any other given module to form a combined rigid loading bed, wherein the second primary loading bed connector is arranged below an upper surface of the second loading bed of the second trailer module, wherein the first jack cradle comprises a first secondary cradle connector, wherein the first secondary cradle connector is connected to the second primary loading bed connector of the second trailer module and therewith connects the first jack cradle to the second trailer module, wherein the first jack cradle is arranged between the first trailer module and the second trailer module;

positioning the upper jack surface of the first jack at a position below the level of the upper surface of the first loading bed of the first trailer module;

positioning the first loading bed of the first trailer module below the object to be transported;

moving the upper jack surface upwards until the first jack
system engages the object; and
rotating the first wheels of the first trailer module to move
the trailer system and the object to a destination.

9. The method according to claim 8, wherein the method
further comprises, after moving the upper jack surface
upwards until the first jack system engages the object, the
step of arranging the object on the first loading bed of the
first trailer module, which step involves the lowering of the
upper surface of the first jack.

10. The method according to claim 8, wherein the method
further comprises, after moving the trailer system and the
object to the destination, the step of moving the object
upwards and/or downwards by the first jack system.

11. The method according to claim 8, wherein the step of
moving the upper jack surface upwards until the first jack
system engages the object includes:

arranging a first jack cassette above the upper jack sur-
face;
moving the upper jack surface upwards, thereby lifting
the first jack cassette to a first elevated position;
supporting the first jack cassette in the first elevated
position;
moving the upper jack surface downwards, while main-
taining the first jack cassette in the first elevated
position;
arranging a second jack cassette above the upper jack
surface and below the first jack cassette; and
moving the second jack cassette to the first elevated
position, thereby lifting the first jack cassette to a
second elevated position which is above the first
elevated position.

\* \* \* \* \*